United States Patent
Do

(10) Patent No.: US 7,656,593 B2
(45) Date of Patent: Feb. 2, 2010

(54) IMAGING LENS

(75) Inventor: Satoshi Do, Saitama (JP)

(73) Assignees: Satoshi Do, Saitama (JP); Milestone Co., Ltd., Tokyo (JP)

( * ) Notice: Subject to any disclaimer, the term of this patent is extended or adjusted under 35 U.S.C. 154(b) by 218 days.

(21) Appl. No.: 11/921,952

(22) PCT Filed: Jun. 13, 2007

(86) PCT No.: PCT/JP2007/061875

§ 371 (c)(1),
(2), (4) Date: Dec. 11, 2007

(87) PCT Pub. No.: WO2008/108011

PCT Pub. Date: Sep. 12, 2008

(65) Prior Publication Data

US 2009/0225441 A1    Sep. 10, 2009

(30) Foreign Application Priority Data

Mar. 8, 2007    (JP)    ............... 2007-058960

(51) Int. Cl.
 *G02B 9/12*    (2006.01)
 *G02B 3/10*    (2006.01)
(52) U.S. Cl. ........................ 359/784; 359/716
(58) Field of Classification Search ............... 359/716, 359/784, 785, 791, 797
See application file for complete search history.

(56) References Cited

U.S. PATENT DOCUMENTS 404,506 A * 6/1889 Schroder .................... 359/796

(Continued)

FOREIGN PATENT DOCUMENTS

JP    2001-242308    9/2001

(Continued)

OTHER PUBLICATIONS

Japanese International Search Report dated Jul. 10, 2007, (PCT/JP2007/061875).

*Primary Examiner*—David N Spector
(74) *Attorney, Agent, or Firm*—Venable LLp; James R. Burdett

(57) ABSTRACT

An imaging lens of which optical performance does not deteriorate even in a high temperature environment, various aberrations are well corrected, optical length is short, and back focus is sufficiently secured. This imaging lens comprises a first junction type compound lens 14, an aperture diaphragm S, a second junction type compound lens 16, and a third junction type compound lens 18, wherein the first junction type compound lens, the aperture diaphragm, the second junction type compound lens, and the third junction type compound lens are arranged in this sequence from an object side to an image side. The first junction type compound lens comprises a first lens, a second lens and a third lens arranged in this sequence from the object side to the image side, the second junction type compound lens comprises a fourth lens, fifth lens and a sixth lens arranged in this sequence from the object side to the image side, and the third junction type compound lens comprises a seventh lens, an eighth lens and a ninth lens arranged in this sequence from the object side to the image side. The first lens, the third lens, the fourth lens, the sixth lens, the seventh lens and the ninth lens are formed of a curable resin material, and the second lens, the fifth lens and the eighth lens are formed of a high softening temperature glass material.

10 Claims, 13 Drawing Sheets

U.S. PATENT DOCUMENTS

| | | | |
|---|---|---|---|
| 1,637,917 A * | 8/1927 | Richter | 359/796 |
| 3,799,656 A * | 3/1974 | Fleischman | 359/777 |
| 6,498,689 B2 | 12/2002 | Katsuma | |
| 6,551,530 B2 | 4/2003 | Koizumi et al. | |
| 6,560,037 B2 | 5/2003 | Dou | |
| 6,862,804 B2 | 3/2005 | Nishio et al. | |
| 7,558,006 B2 * | 7/2009 | Choi et al. | 359/716 |
| 2006/0050399 A1 | 3/2006 | Nakagawa | |
| 2007/0014033 A1 | 1/2007 | Shinohara | |

FOREIGN PATENT DOCUMENTS

| | | |
|---|---|---|
| JP | 2001-305309 | 10/2001 |
| JP | 2002-154169 | 5/2002 |
| JP | 2002-154170 | 5/2002 |
| JP | 2003-311757 | 11/2003 |
| JP | 2004-053834 | 2/2004 |
| JP | 2004-328474 | 11/2004 |
| JP | 2005-067999 | 3/2005 |
| JP | 2005-084273 | 3/2005 |
| JP | 2005-258329 | 9/2005 |
| JP | 2005-305938 | 11/2005 |
| JP | 2006-121079 | 5/2006 |
| JP | 2006-195053 | 7/2006 |
| JP | 2006-308669 | 11/2006 |
| JP | 2006-323365 | 11/2006 |

* cited by examiner

Back Focus bf = 0.352 mm

Optical Length L = 1.079 mm

Back Focus bf = 0.391 mm

Optical Length L = 1.137 mm

Back Focus bf = 0.350 mm

Optical Length L = 1.079 mm

IMAGING LENS

TECHNICAL FIELD

The present invention relates to an imaging lens, and more particularly to an imaging lens that can be suitably mounted on a portable telephone or the like.

BACKGROUND ART

In a portable telephone with a built-in digital camera, an imaging lens is mounted on a printed circuit board. As a method for mounting an imaging lens on a printed circuit board, a reflow soldering processing is used. Hereafter the reflow soldering processing may simply be called "reflow processing". Reflow processing is a method for soldering an electronic component on a printed circuit board by placing a solder ball in advance at a location where an electronic component is connected, placing the electronic component there, heating to melt the solder ball, then cooling the solder down.

Generally in mass production steps, a reflow step for performing reflow processing is used as a method for mounting electronic elements or such components as an imaging lens on a printed circuit board. If a reflow step is used, the mounting cost of components on a printed circuit board can be decreased, and the manufacturing quality can be maintained at a predetermined level.

In the reflow step of the manufacturing steps of a portable telephone comprising an imaging lens, not only are electronic components arranged at predetermined positions on a printed circuit board, but also the imaging lens itself and a socket for installing the imaging lens are arranged on the printed circuit board.

The imaging lenses installed in portable telephones are largely made of plastic in order to decrease the manufacturing cost and to insure lens performance. Therefore a heat resistant socket component is used for installing the imaging lens, in order to prevent thermal deformation of the imaging lens in a high temperature environment, which makes it impossible to maintain optical performance thereof.

In other words, in the reflow step, a heat resistant socket component for installing an imaging lens is mounted on the printed circuit board of the portable telephone, and the imaging lens is installed in this socket after the reflow step, so that the imaging lens is not exposed to high temperature in the reflow step (see Patent Documents 1 to 3). However using a heat resistant socket component for installing the imaging lens makes the manufacturing steps complicated, and increases the manufacturing cost, including the cost of this heat resistant socket.

Recently it has been demanded that the optical performance of the imaging lens installed in a portable telephone does not deteriorate even if the portable telephone itself is placed in about a 150° C. high temperature environment, considering the case of a portable telephone that is left in an automobile which temporarily becomes a high temperature environment. A conventional imaging lens made of plastic material cannot meet this demand.

In order to implement an imaging lens of which optical performance is maintained even in a high temperature environment, forming an imaging lens using a high softening temperature mold glass material is possible (e.g. see Patent Document 4). The temperature at which a high softening temperature mold glass material softens is several hundred degrees or more, so the deterioration of the optical performance of an imaging lens in a high temperature environment can be avoided, but at the moment an imaging lens made of mold glass material is not popular since the manufacturing cost is very high.

In addition to the above thermal characteristics, an imaging lens installed on a portable telephone must satisfy the following conditions related to optical characteristics. One condition is that the optical length must be short. An optical length is a length from an entrance plane at an object side to an image formation plane (also called the "image sensing plane") of the imaging lens. In other words, when a lens is designed, the ratio of the optical length to the composite focal lengths of the imaging lens must be minimized. In the case of a portable telephone, for example, this optical length must at least be shorter than the thickness of the portable telephone main unit.

On the other hand, a back focus, which is defined as a distance from the exit plane on the image side face of the imaging lens to the image sensing plane, should be as long as possible. In other words, when the lens is designed, the ratio of the back focus to the focal lengths must be maximized. This is because such components as a filter or cover glass must be inserted between the imaging lens and the image sensing plane.

In addition to the above, imaging lenses are of course required to have various aberrations corrected sufficiently that image distortion is not noticed visually, and moreover aberrations should be corrected so as to be sufficiently small as required by the integrated density of the image sensing element (also called "pixels"). That is, the various aberrations must be satisfactorily corrected; hereafter, an image in which aberrations have been satisfactorily corrected may be called a "satisfactory image".

Patent Document 1: Japanese Patent Application Laid-Open No. 2006-121079
Patent Document 2: Japanese Patent Application Laid-Open No. 2004-328474
Patent Document 3: Japanese Patent No. 3755149
Patent Document 4: Japanese Patent Application Laid-Open No. 2005-067999

DISCLOSURE OF THE INVENTION

Problems to be Solved by the Invention

With the foregoing in view, it is an object of the present invention to provide an imaging lens suitable for being installed in a portable telephone, and of which heat resistance is guaranteed and optical performance does not deteriorate, even in a reflow step or even if the imaging lens is installed in a portable telephone, and is temporarily placed in a high temperature environment, such as inside an automobile.

It is another object of the present invention to provide an imaging lens of which optical length is short enough to be installed in a portable telephone, and the back focus is long enough to insert such a component as a filter or cover glass between the imaging lens and the image sensing plane, and with which a satisfactory image is acquired.

Means for Solving the Problems

To achieve the above object, a first imaging lens of this invention comprises a first junction type compound lens, an aperture diaphragm, a second junction type compound lens, and a third junction type compound lens, wherein the first junction type compound lens, the aperture diaphragm, the second junction type compound lens and the third junction type compound lens are arranged in this sequence from an object side to an image side.

The first junction type compound lens comprises a first lens, a second lens and a third lens arranged in this sequence from the object side to the image side, the second junction type compound lens comprises a fourth lens, a fifth lens and a sixth lens arranged in this sequence from the object side to the image side, and the third junction type compound lens comprises a seventh lens, an eighth lens and a ninth lens arranged in this sequence from the object side to the image side.

The first lens, the third lens, the fourth lens, the sixth lens, the seventh lens and the ninth lens are formed of a curable resin material, and the second lens, the fifth lens and the eighth lens are formed of a high softening temperature glass material. The first lens and the second lens are directly bonded, the second lens and the third lens are directly bonded, the fourth lens and the fifth lens are directly bonded, the fifth lens and the sixth lens are directly bonded, the seventh lens and the eighth lens are directly bonded, and the eighth lens and the ninth lens are directly bonded.

A second imaging lens of this invention comprises an aperture diaphragm (first diaphragm), a first junction type compound lens, a second diaphragm, a second junction type compound lens, and a third junction type compound lens, wherein the aperture diaphragm (first diaphragm), the first junction type compound lens, the second diaphragm, the second junction type compound lens and the third junction type compound lens are arranged in this sequence from an object side to an image side.

The first junction type compound lens comprises a first lens, a second lens and a third lens arranged in this sequence from the object side to the image side, the second junction type compound lens comprises a fourth lens, a fifth lens and a sixth lens arranged in this sequence from the object side to the image side, and the third junction type compound lens comprises a seventh lens, an eighth lens and a ninth lens arranged in this sequence from the object side to the image side.

The first lens, the third lens, the fourth lens, the sixth lens, the seventh lens and the ninth lens are formed of a curable resin material, and the second lens, the fifth lens and the eighth lens are formed of a high softening temperature glass material. The first lens and the second lens are directly bonded, the second lens and the third lens are directly bonded, the fourth lens and the fifth lens are directly bonded, the fifth lens and the sixth lens are directly bonded, the seventh lens and the eighth lens are directly bonded, and the eighth lens and the ninth lens are directly bonded.

Here a curable resin material refers to both a thermosetting resin material and a UV-curable resin material.

In the first and second imaging lenses, it is preferable to set so as to satisfy the following (1) to (12) Conditions.

$$0 \leq |N_2 - N_1| \leq 0.1 \quad (1)$$

$$0 \leq |N_2 - N_3| \leq 0.1 \quad (2)$$

$$0 \leq |v_2 - v_1| \leq 30.0 \quad (3)$$

$$0 \leq |v_2 - v_3| \leq 30.0 \quad (4)$$

$$0 \leq |N_5 - N_4| \leq 0.1 \quad (5)$$

$$0 \leq |N_5 - N_6| \leq 0.1 \quad (6)$$

$$0 \leq |v_5 - v_4| \leq 30.0 \quad (7)$$

$$0 \leq |v_5 - v_6| \leq 30.0 \quad (8)$$

$$0 \leq |N_8 - N_7| \leq 0.1 \quad (9)$$

$$0 \leq |N_8 - N_9| \leq 0.1 \quad (10)$$

$$0 \leq |v_8 - v_7| \leq 30.0 \quad (11)$$

$$0 \leq |v_8 - v_9| \leq 30.0 \quad (12)$$

where
$N_1$: refractive index of the first lens
$N_2$: refractive index of the second lens
$N_3$: refractive index of the third lens
$v_1$: Abbe number of the first lens
$v_2$: Abbe number of the second lens
$v_3$: Abbe number of the third lens
$N_4$: refractive index of the fourth lens
$N_5$: refractive index of the fifth lens
$N_6$: refractive index of the sixth lens
$v_4$: Abbe number of the fourth lens
$v_5$: Abbe number of the fifth lens
$v_6$: Abbe number of the sixth lens
$N_7$: refractive index of the seventh lens
$N_8$: refractive index of the eighth lens
$N_9$: refractive index of the ninth lens
$v_7$: Abbe number of the seventh lens
$v_8$: Abbe number of the eighth lens
$v_9$: Abbe number of the ninth lens The shapes of the first to ninth lenses of the first and second imaging lenses are as follows.

The second lens, the fifth lens and the eighth lens can be plane parallel glass plates. A plane parallel glass plate may also be called an "optical-parallel glass plate". A plane parallel glass plate normally is not called a lens, but in the description of the present invention, the plane parallel glass plate may be included in a lens description, regarding this as a special case where the radius of curvature of the lens surface is infinite.

When the second lens, the fifth lens and the eighth lens are plane parallel glass plates, the first lens can be a plano-convex lens where the object side face of the first lens is a convex surface facing the object side on a paraxial line, the third lens can be a plano-concave lens where the image side face of the third lens is a concave surface facing the image side on a paraxial line, the fourth lens can be a plano-concave lens where the object side face of the fourth lens is a concave surface facing the object side on a paraxial line, the sixth lens can be a plano-convex lens where the image side face of the sixth lens is a convex surface facing the image side on a paraxial line, the seventh lens can be a plano-convex lens where the object side face of the seventh lens is a convex surface facing the object side on a paraxial line, and the ninth lens can be a plano-concave lens where the image side face of the ninth lens is a concave surface facing the image side on a paraxial line.

When the second lens, the fifth lens, and the eighth lens are plane parallel glass plates, the following mode is also acceptable. That is, the first lens can be a plano-convex lens where the object side face of the first lens is a convex surface facing the object side on a paraxial line, the third lens can be a plano-convex lens where the image side face of the third lens is a convex surface facing the image side on a paraxial line, the fourth lens can be a plano-concave lens where the object side of the fourth lens is a concave surface facing the object side on a paraxial line, the sixth lens can be a plano-convex lens where the image side of the sixth lens is a convex surface facing the image side on a paraxial line, the seventh lens can be a plano-convex lens where the object side of the seventh lens is a convex surface facing the object side on a paraxial line, and the ninth lens can be a plano-concave lens where the image side face of the ninth lens is a concave surface facing the image side on a paraxial line.

The second lens can be a meniscus lens of which convex surface faces the object side, the first lens can be a lens where the object side face of the first lens is a convex surface facing the object side on a paraxial line, the third lens can be a lens where the image side face of the third lens is a concave surface facing the image side on a paraxial line, the fifth lens can be a meniscus lens of which convex surface faces the image side, the fourth lens can be a lens where the object side face of the fourth lens is a concave surface facing the object side on a paraxial line, the sixth lens can be a lens where the image side face of the sixth lens is a convex surface facing the image side on a paraxial line, the eighth lens can be a bi-convex lens of which both side faces are convex surfaces, the seventh lens can be a lens where the object side face of the seventh lens is a convex surface facing the object side on a paraxial line, and the ninth lens can be a lens where the image side face of the ninth lens is a concave surface facing the image side on a paraxial line.

The second lens can be a bi-convex lens of which both side faces are convex surfaces, the first lens can be a lens where the object side face of the first lens is a convex surface facing the object side on a paraxial line, the third lens can be a lens where the image side face of the third lens is a convex surface facing the image side on a paraxial line, the fifth lens can be a meniscus lens of which convex surface faces the image side, the fourth lens can be a lens where the object side face of the fourth lens is a concave surface facing the object side on a paraxial line, the sixth lens can be a lens where the image side face of the sixth lens is a convex surface facing the image side on a paraxial line, the eighth lens can be a meniscus lens of which convex surface faces the image side, the seventh lens can be a lens where the object side face of the seventh lens is a convex surface facing the object side on a paraxial line, and the ninth lens can be a lens where the image side face of the ninth lens is a concave surface facing the image side on a paraxial line.

The second lens, the fifth lens and the eighth lens can be a plane parallel glass plate, a meniscus lens or a bi-convex lens, as mentioned above, but are not limited to these, but a concave lens, for example, can also be used. The shapes of the second lens, the fifth lens and the eighth lens are determined to be convenient for forming the first lens and the third lens, the fourth lens and the sixth lens, and the seventh lens and the ninth lens, which are resin lenses, formed on both sides respectively, or to be convenient for designing the imaging lens of this invention.

In other words, if the second lens, the fifth lens and the eighth lens are implemented by a lens having a curved surface, such as a meniscus lens, convex lens or concave lens, the bonded surfaces of the second lens, the fifth lens and the eighth lens with resin lenses formed to be bonded on both sides of the second lens, the fifth lens and the eighth lens respectively, become wider than the case of implementing these lenses with plane parallel glass plates, and the adhesive strength increases accordingly. Also the range of choice of the radius of curvature of the second lens, the fifth lens and the eighth lens, which are the design parameters for improving the performance of the lens, such as aberration, increases, so the design of the imaging lens of this invention becomes easier.

On the other hand, by decreasing the radius of curvature (increasing the curvature) of the second lens, the fifth lens and the eighth lens, preventing the entry of bubbles into the bonding interface becomes difficult when junction type compound lenses (the first, second and third junction type compound lenses) are formed. Also using a meniscus lens, instead of the plane parallel glass plates, for the second lens, the fifth lens and the eighth lens, increases the manufacturing cost compared to the case of using plane parallel glass plates.

To form the first and second imaging lenses of the present invention, it is preferable that the object side face of the first lens, the image side face of the third lens, the object side face of the fourth lens, the image side face of the sixth lens, the object side face of the seventh lens, and the image side face of the ninth lens, are aspheric.

To form the first and the second imaging lenses of the present invention, it is preferable that the curable resin material, which is a material of the first lens, the third lens, the fourth lens, the sixth lens, the seventh lens and the ninth lens, is a transparent curable silicone resin containing a transparent adhesive. Transparent indicates that the light absorption of visible light is small (transparent) enough to have no influence on practical use.

EFFECTS OF THE INVENTION

According to the first and second imaging lenses of the present invention, in the first junction type compound lens constituting these imaging lenses, the first and the third lenses, which are formed of curable resin material, sandwich and are directly bonded to the second lens, which is formed of a high softening temperature glass material, from both sides. In the second junction type compound lens, the fourth and the sixth lenses, which are formed of a curable resin material, sandwich and are directly bonded to the fifth lens, which is formed of a high softening temperature glass material, from both sides. In the third junction type compound lens, the seventh and the ninth lenses, which are formed of a curable resin material, sandwich and are directly bonded to the eighth lens, which is formed of a high softening temperature glass material, from both sides.

Here the high softening temperature glass material refers to a glass material of which softening temperature is higher than both the temperature during reflow processing and the maximum ambient temperature in the design specifications of the junction type compound lens. In the following description, the glass material refers to the high softening temperature glass material when the thermal characteristics are described, and the optical glass material when the optical characteristics are described.

The curable resin material does not become soft once the curing processing is performed, even if the temperature becomes higher than a predetermined temperature. If exposed to a predetermined temperature, referred to as the "softening temperature" (also called "glass transition temperature), the curable resin material softens and becomes plasticized, which is different from the nature of plasticizing resin material such as plastic material. In other words, once the curing process is performed and the material solidifies, the curable resin material does not change is geometric shape.

Therefore the geometric shape of the first lens, third lens, fourth lens, sixth lens, seventh lens and ninth lens does not change, and the optical performance thereof does not deteriorate even if placed in a high temperature environment. The optical performance of the second lens, fifth lens and eighth lens does not deteriorate either even if placed in a high temperature environment, since they are formed of high softening temperature glass material. The high temperature environment here refers to a temperature environment of which temperature is higher than both the temperature during reflow processing and the maximum temperature in the design specifications of the junction type compound lens.

Therefore the optical performance of the first junction type compound lens, the second junction type compound lens, and the third junction type compound lens is guaranteed in the reflow step, and even in a high temperature environment at maximum temperature, which can be expected when using an imaging lens.

If a single lens is created using only curable resin, such a problem as a change in the curved surface shape of the lens occurs during the curing process. However the first lens and the second lens are directly bonded, and the second and the third lens are directly bonded. The fourth lens and the fifth lens are directly bonded, and the fifth lens and the sixth lens are directly bonded. The seventh lens and the eighth lens are directly bonded, and the eighth lens and the ninth lens are directly bonded. In other words, the first lens and the third lens sandwich and are directly bonded to the second lens, which is formed of high softening temperature glass material, from both sides, the fourth lens and the sixth lens sandwich and are directly bonded to the fifth lens, which is formed of high softening temperature glass material, from both sides, and the seventh lens and the ninth lens sandwich and are directly bonded to the eighth lens, which is formed of high softening temperature glass material, from both sides. Therefore such a problem as deformation of the curved surface shape of the first lens, third lens, fourth lens, sixth lens, seventh lens and ninth lens does not occur.

Here direct bonding refers to bonding a lens A and a lens B intentionally with intervening nothing between lens A and lens B, except in the case when such an intervention is unavoidable. Lens A corresponds to the first lens, and lens B corresponds to the second lens, for example. This is the same for each combination of the second and third lenses, the fourth and fifth lenses, the fifth and sixth lenses, the seventh and eighth lenses, and the eighth and ninth lenses.

Now the optical characteristics of the imaging lens of the present invention will be described.

The optical structural principle of the imaging lens of the present invention implements two roles: that is aberration correction and image formation, by a single junction type compound lens of which optical characteristics, such as a refractive index, are as uniform as possible. In other words, it is preferable that the respective refractive index and the Abbe number of the first to the third lenses, constituting the first junction type compound lens of this invention, do not differ very much from each other. It is also preferable that the respective refractive index and the Abbe number of the fourth to sixth lenses, constituting the second junction type compound lens, do not differ very much from each other. It is also preferable that the respective refractive index and the Abbe number of the seventh to ninth lenses, constituting the third junction type compound lens, do not differ very much from each other.

In other words, it is ideal that the respective refractive index and the Abbe number of the first to third lenses, the fourth to sixth lenses, and the seventh to ninth lenses, are the same as each other. However in reality, it is extremely difficult to determine the combination of an optical glass material and a curable resin material with which the refractive index and the Abbe number are perfectly the same.

Therefore the inventor of the present invention investigated, through various simulations and prototyping, the difference of the refractive indexes and the Abbe numbers between the optical glass material and curable resin material, which could generate satisfactory images in the first, second and third junction type compound lenses respectively. As a result, it was confirmed that satisfactory images can be acquired by constructing an imaging lens with satisfying the above (1) to (12) Conditions.

In other words, if the difference between the refractive index $N_1$ of the first lens and the refractive index $N_2$ of the second lens, the difference between the refractive index $N_2$ of the second lens and the refractive index $N_3$ of the third lens, the difference between the refractive index $N_4$ of the fourth lens and the refractive index $N_5$ of the fifth lens, the difference between the refractive index $N_5$ of the fifth lens and the refractive index $N_6$ of the sixth lens, the difference between the refractive index $N_7$ of the seventh lens and the refractive index $N_8$ of the eighth lens, and the difference between the refractive index $N_8$ of the eighth lens and the refractive index $N_9$ of the ninth lens, are within 0.1 respectively, then distortion aberration, astigmatism aberration and chromatic/spherical aberration become small enough to generate satisfactory images.

If the difference between the Abbe number $v_1$ of the first lens and the Abbe number $v_2$ of the second lens, the difference between the Abbe number $v_2$ of the second lens and the Abbe number $v_3$ of the third lens, the difference between the Abbe number $v_4$ of the fourth lens and the Abbe number $v_5$ of the fifth lens, the difference between the Abbe number $v_5$ of the fifth lens and the Abbe number $v_6$ of the sixth lens, the difference between the Abbe number $v_7$ of the seventh lens and the Abbe number $v_8$ of the eighth lens, and the difference between the Abbe number $v_8$ of the eighth lens and the Abbe number $v_9$ of the ninth lens, are within 30.0 respectively, then the value of the chromatic aberration can be small enough to generate satisfactory images, and the images can have sufficient contrast.

Also as shown by the following embodiments, an imaging lens of which optical length is short enough to be allowed to be installed in a portable telephone, and the back focus is long enough to allow inserting such components as a filter and cover glass between the imaging lens and the image sensing plane, and with which satisfactory images can be acquired, can be implemented by satisfying the above (1) to (12) Conditions.

The first imaging lens of this invention is characterized in that the aperture diaphragm for defining an entrance pupil is disposed between the first junction type compound lens and the second junction type compound lens. Because of this, the aperture diaphragm has a function to remove the flare generated in the first junction type compound lens.

The second imaging lens of this invention is characterized in that the aperture diaphragm (first diaphragm) for defining an entrance pupil is disposed on the front face of the first junction type compound lens, that is at the object side of the first junction type compound lens. Because of this, the entrance pupil can be closer to the object side, and the principal ray can be entered at an angle close to an angle perpendicular to the image face, therefore the generation of shading can be prevented. As a consequence, in the second imaging lens, the entrance pupil diameter can be set to a larger value, and a lens with a small F number, that is a bright lens, can be implemented. As the later described embodiments show, the F numbers of the imaging lens shown in the second, third and fifth embodiments, which are embodiments of the second imaging lens, are smaller than the F numbers of the imaging lens shown in the first and fourth embodiments, which are embodiments of the first imaging lens.

The first imaging lens, on the other hand, has a feature that the F number can be easily changed in the manufacturing steps. In other words, the value of the aperture diaphragm is changed in order to change the F number of the imaging lens, and in the case of the first imaging lens having a configuration that the aperture diaphragm is disposed between the first junction type compound lens and the second junction type compound lens, it is sufficient to change the aperture diaphragm in order to change the F number.

However in order to dispose the aperture diaphragm on the front face of the first junction type compound lens, as in the case of the second imaging lens, the size of the aperture must be set so that the tip of the barrel, for securing the first to third junction type compound lenses constituting the imaging lens, plays a role of the aperture diaphragm, in the stage where the barrel is fabricated. In other words, each time the F number is changed, the barrel of the imaging lens must be redesigned, and the new die for manufacturing the barrel of the imaging lens must be made again.

As described above, the first imaging lens and the second imaging lens have different characteristics. Which imaging lens will be used is a matter of selection depending on the convenience for the target (e.g. portable telephone, digital camera) for which the imaging lens is used.

EXPLANATION OF REFERENCE SYMBOLS

Figure 1:
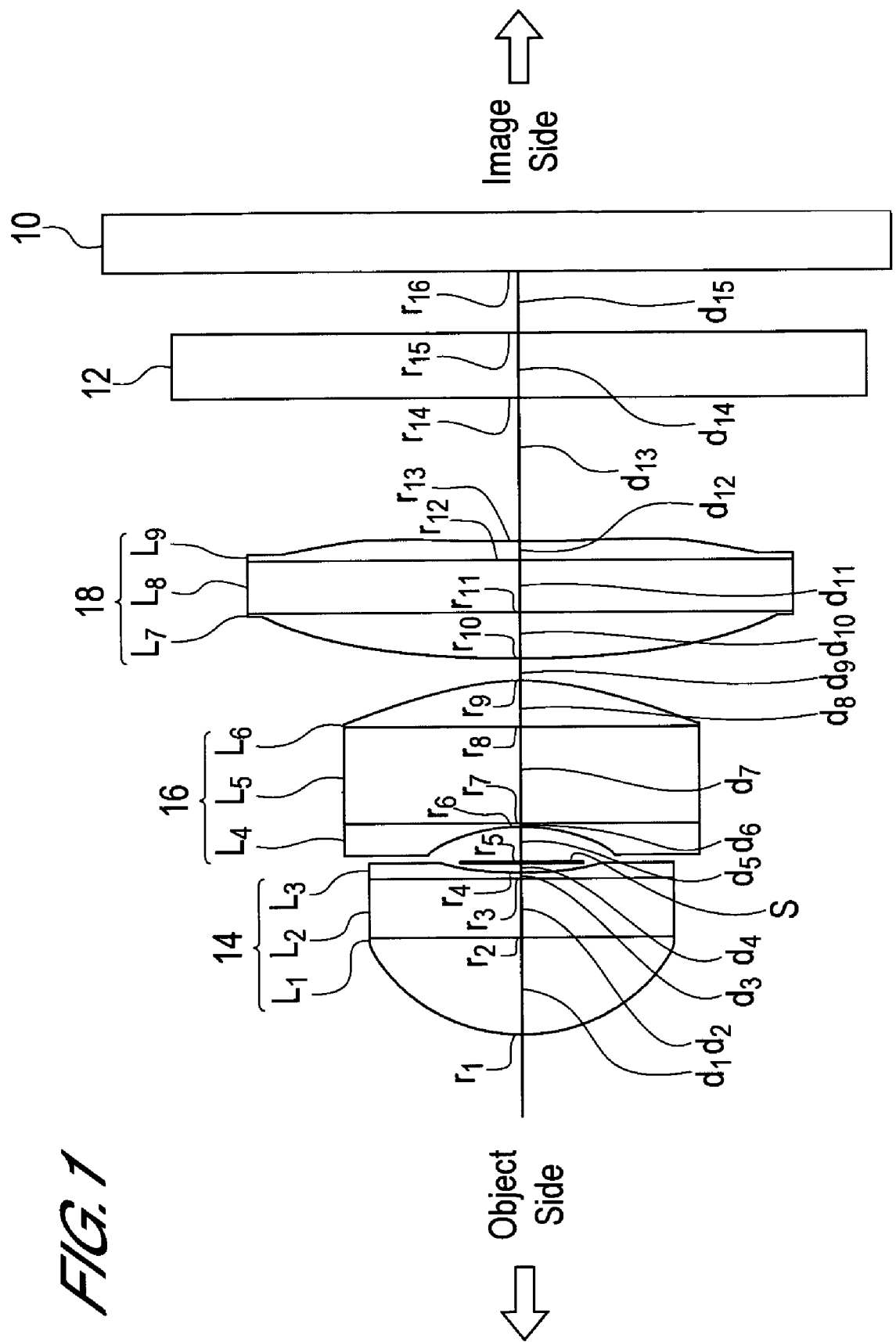
FIG. 1 is a cross-sectional view depicting a first imaging lens according to the present invention.

10 Image sensing element
12 Cover glass
14 First junction type compound lens
16 Second junction type compound lens
18 Third junction type compound lens
20, 30 Die
24, 34 Transparent curable silicone resin
26 Optical glass
36 Object side face of first lens
38 Image side face of third lens
S Diaphragm (aperture diaphragm)
$S_1$ First diaphragm
$S_2$ Second diaphragm
$L_1$ First lens
$L_2$ Second lens
$L_3$ Third lens
$L_4$ Fourth lens
$L_5$ Fifth lens
$L_6$ Sixth lens
$L_7$ Seventh lens
$L_8$ Eighth lens
$L_9$ Ninth lens

BEST MODE FOR CARRYING OUT THE INVENTION

Embodiments of the present invention will now be described with reference to the drawings. Each drawings, however, simply illustrates one configuration example of the present invention, and roughly shows a cross-section of each composing element and positional relationship in order to assist in the understanding of the present invention, and does not limit the present invention to the illustrated example. In the following description, specific materials and conditions may be used, but these materials and conditions are merely suitable examples of the preferred embodiments, and therefore the present invention is not limited to these aspects.

Figure 6:
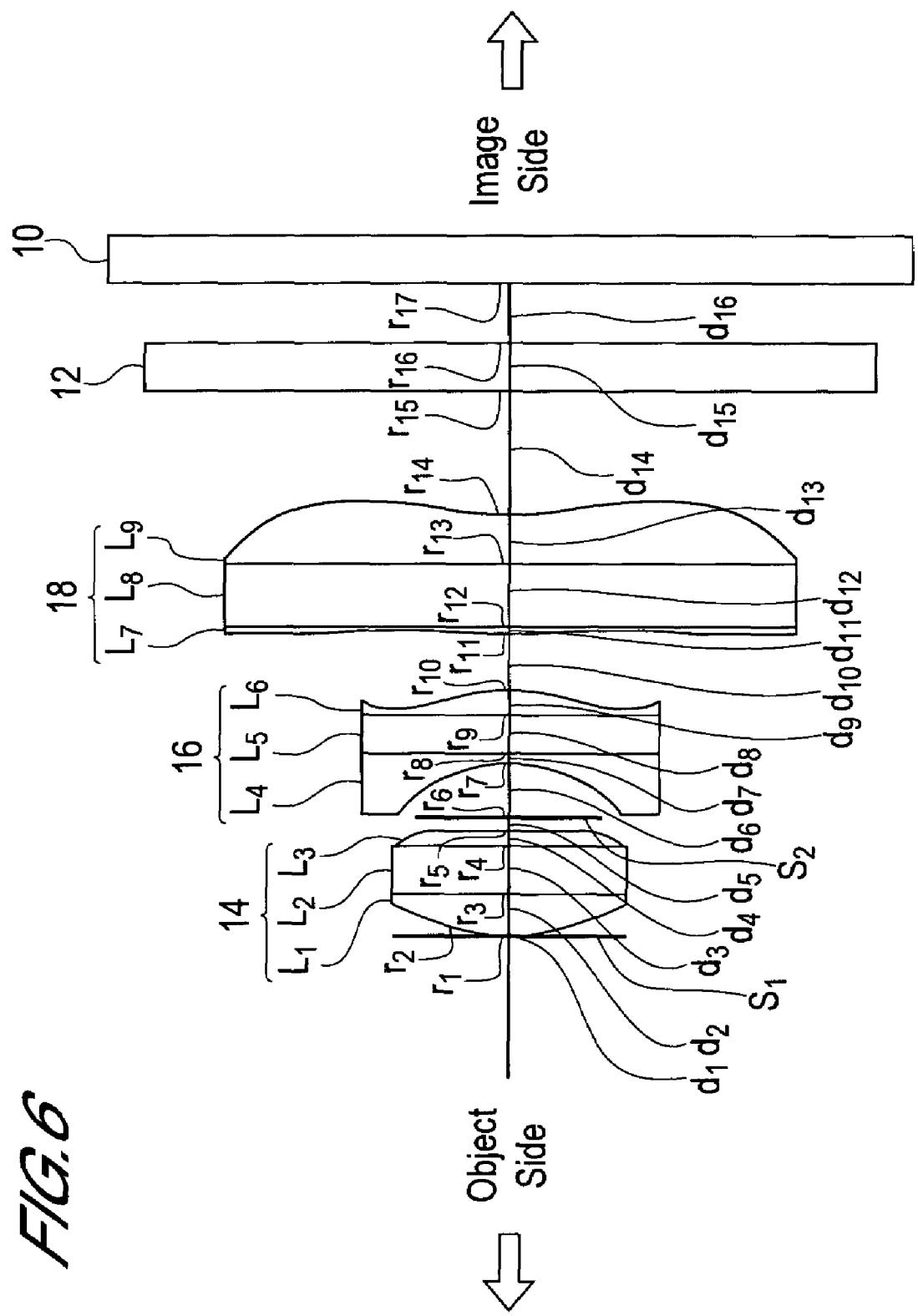
FIG. 6 is a cross-sectional view depicting a second imaging lens according to the present invention.

FIG. 1 is a diagram depicting a configuration of a first imaging lens of the present invention, and FIG. 6 is a diaphragm depicting a configuration of a second imaging lens of the present invention. Embodiments of the first imaging lens of the present invention are shown in the first embodiment and the fourth embodiment. Embodiments of the second imaging lens of the present invention are shown in the second embodiment, the third embodiment and the fifth embodiment.

As FIG. 1 and FIG. 6 show, a first, second and third lenses constituting a first junction type compound lens 14 are denoted with $L_1$, $L_2$ and $L_3$ respectively. A fourth, fifth and sixth lenses constituting a second junction type compound lens 16 are denoted with $L_4$, $L_5$ and $L_6$ respectively. A seventh, eighth and ninth lenses constituting a third junction type compound lens 18 are denoted with $L_7$, $L_8$ and $L_9$ respectively.

In the first imaging lens of this invention shown in FIG. 1, a diaphragm S disposed between the first junction type compound lens 14 and the second junction type compound lens 16 plays a role of an aperture diaphragm, and defines a position of an entrance pupil.

In the second imaging lens of this invention shown in FIG. 6, on the other hand, a first diaphragm $S_1$ disposed on a front face of the first junction type compound lens 14 (front face $r_2$ of the first lens) plays a role of an aperture diaphragm and defines a position of an entrance pupil. A second diaphragm $S_2$ disposed between the first junction type compound lens 14 and the second junction type compound lens 16 plays a role of preventing a flare, which is a phenomena where the contrast of an image decreases, or a smear, which is a phenomena where the image smears.

In other words, in the second imaging lens of this invention, the first diaphragm $S_1$ is a diaphragm which plays a role of determining the basic characteristics of an imaging lens, that is defining a position of the entrance pupil, defining an F number, and defining various aberration characteristics such as a distortion aberration and astigmatism aberration, and is therefore an essential composing element in this invention. The second diaphragm $S_2$, on the other hand, is a composing element for improving the contrast of an image, which is an additional characteristic, therefore it is preferable to install [the second diaphragm $S_2$], however the imaging lens of the present invention is implemented even if [the second diaphragm $S_2$] is not installed.

Within a range where no misunderstanding is caused, $r_i$ (i=1, 2, 3, ..., 17) may be used as a variable that indicates a value of a radius of curvature on an optical axis, or a symbol that identifies a lens face, cover glass face or image sensing plane (e.g. $r_2$ is used to indicate the object side face of the first lens $L_1$ constituting the first junction type compound lens 14).

Table 1 to Table 5 show the specific values of these parameters, such as $r_i$ (i=1, 2, 3, ..., 17) and $d_i$ (i=1, 2, 3, ..., 16) shown in the drawings. The suffix i is attached corresponding to a diaphragm, surface number of each lens or thickness of the lens, or the surface spacing of the lens sequentially from the object side to the image side.

$r_i$ is a radius of curvature on the optical axis on the i-th surface,
$d_i$ is a distance from the i-th surface to the (i+1)th surface,
$N_j$ is a refractive index of the j-th lens $L_j$, and
$v_j$ is an Abbe number of the material of the j-th lens $L_j$.
Here j=1, 2, 3, ..., 9, and indicates the first, second, third ... ninth lens respectively.

The symbols of the surface number ($r_i$ (i=1, 2, 3, ..., 17)) and the surface spacing ($d_i$ (i=1, 2, 3, ..., 16)) defined in FIG. 1 and FIG. 6 are omitted in FIG. 2, FIG. 7, FIG. 11, FIG. 15 and FIG. 19 so that the drawings do not become complicated.

In FIG. 1 and FIG. 6, the aperture of the diaphragm is shown by a segment. This is because the intersection of the diaphragm surface and the optical axis must be clearly shown to define the distance from the lens surface to the diaphragm surface. In FIG. 2, FIG. 7, FIG. 11, FIG. 15 and FIG. 19, which are cross-sectional views of the imaging lenses of the first embodiment to the fifth embodiment respectively, a main body of the diaphragm for shielding light is shown by a half line of which the start point is the edge of the aperture, by opening the aperture of the diaphragm, which is unlike FIG. 1 and FIG. 6. This is because the status of the diaphragm must be shown by opening the aperture of the diaphragm in order to enter such a ray as a principal ray.

The optical length L is a distance from the object side face $r_1$ of the first lens $L_1$ to the image sensing plane in the first imaging lens, and is a distance from the first diaphragm $S_1$ to the image sensing plane in the second imaging lens. The back focus bf is a distance from the image side surface of the ninth lens $L_9$ constituting the third junction type compound lens 18 to the image sensing plane. Here the length from the image side face of the ninth lens $L_9$ to the image sensing plane, which is measured without a cover glass, is regarded as the back focus bf.

Table 1 to Table 5 show a thickness of the first to third junction type compound lenses constituting the imaging lenses of the first embodiment to fifth embodiment respectively, the radius of curvature of the curved surfaces of the first to ninth lenses constituting these lenses, and the data on the position spacing of these lenses and the positional relationship of these lenses and diaphragms. The aspherical data of the first, third, fourth, sixth, seventh and ninth lenses are shown in each column in Table 1 to Table 5 respectively with the surface numbers. The value $r_i$ (i=1, 2, 3, ..., 14) of the radius of curvature on the optical axis is shown as a positive value if it is convex to the object side, and as a negative value if it is convex to the image side.

Both surfaces when the second lens is a plane parallel glass plate, both surface when the fifth lens is a plane parallel glass plate, both surfaces when the eighth lens is a plane parallel glass plate, and the surfaces of diaphragm S, the first diaphragm $S_1$, the second diaphragm $S_2$, and the cover glass (or filter), are planes, so the radius of curvature is indicated as ∞. The image sensing plane is a plane, so $r_{16}=\infty$ which indicates the image sensing plane is omitted in Table 1 to Table 4. In Tables 2, 3 and 5, $r_{17}=\infty$ which indicates the image sensing plane is omitted.

The aspherical surface used for this invention is given by the following expression.

$$Z = ch^2/[1+[1-(1+k)c^2h^2]^{1/2}] + A_0 h^4 + B_0 h^6 + C_0 h^8 + D_0 h^{10}$$

where

Z: depth from the vertex of the surface to the contact surface
c: curvature of the surface on the optical axis
h: height from the optical axis
k: cone constant
$A_0$: aspherical surface coefficient of degree 4
$B_0$: aspherical surface coefficient of degree 6
$C_0$: aspherical surface coefficient of degree 8
$D_0$: aspherical surface coefficient of degree 10

In Table 1 to Table 5 of this description, the numeric value to indicate an aspherical surface coefficient is denoted by an exponent, and "e−1", for example, means "the −1th power of 10". The value indicated as the focal lengths f is a composite focal lengths of the first junction type compound lens, the second junction type compound lens and the third junction type compound lens. For each embodiment, the open F number (also called the open F value), which is an index of the brightness of the lens, is indicated by Fno. The open F number refers to the F number when the diameter of the aperture diaphragm is the maximum by design. The diagonal length 2Y of the square image surface is indicated as the image height. Y is a value half of the diagonal length of the square image surface.

Now the imaging lenses according to the first embodiment to the fifth embodiment will be described with reference to FIG. 1 to FIG. 22.

The distortion aberration curves shown in FIG. 3, FIG. 8, FIG. 12, FIG. 16 and FIG. 20 show the aberration (the amount by which the tangent condition is not satisfied, expressed as a percentage along the horizontal axis) with respect to the distance from the optical axis (expressed as a percentage along the vertical axis, with the maximum distance from the optical axis within the image plane equal to 100). The astigmatic aberration curves shown in FIG. 4, FIG. 9, FIG. 13, FIG. 17, and FIG. 21 show the amounts of aberration along the horizontal axis (in mm units) for a distance from the optical axis, similarly to a distortion aberration curve. Astigmatism is represented as aberration amounts (in mm units) in the meridional plane and in the sagittal plane.

Figure 22:
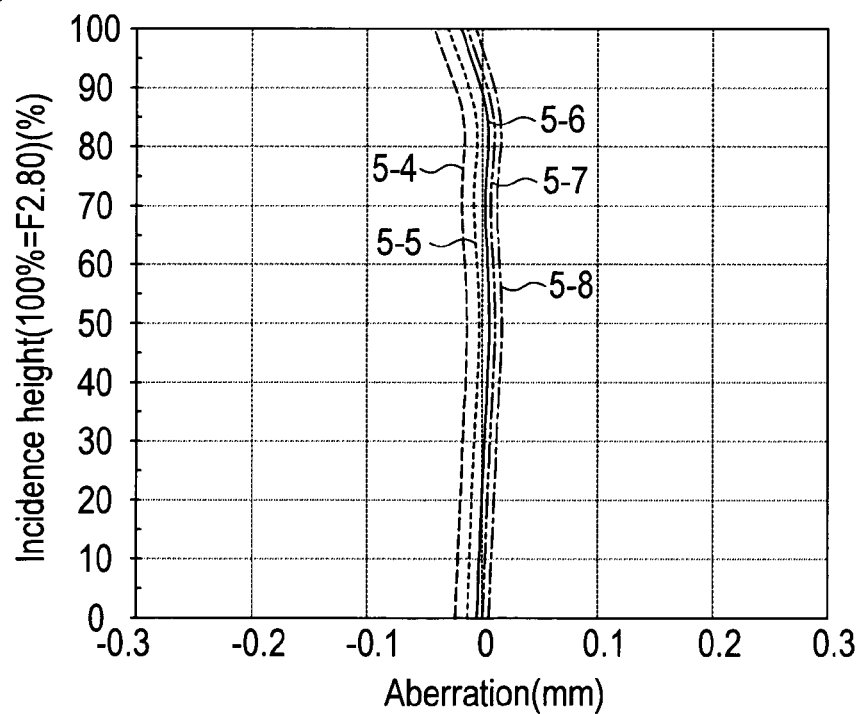
FIG. 22 is a diagram depicting the chromatic/spherical aberration of the imaging lens of the fifth embodiment; and, FIG. 23 are diagrams depicting the manufacturing steps of a junction type compound lens.

The chromatic/spherical aberration curves shown in FIG. 5, FIG. 10, FIG. 14, FIG. 18, FIG. and FIG. 22 show the amount of aberration along the horizontal axis (in mm units) for an incidence height along the vertical axis. The incidence height in the vertical axis is shown as a value converted into an F number. For example, in the case of a lens of which Fno is 3.40, the incidence height h=100% of the vertical axis corresponds to F=3.40.

In a chromatic/spherical aberration curve, aberration amounts are shown for the C line (light of wavelength 656.3 nm), the d line (light of wavelength 587.6 nm), the e line (light of wavelength 546.1 nm), the F line (light of wavelength 486.1 nm), and the g line (light of wavelength 435.8 nm).

Table 1 to Table 5 show the list of the radius of curvature (mm units), lens surface spacing (mm units), refractive index of lens material, Abbe number of lens material, focal lengths, F number, image height and aspherical surface coefficient of composing lenses of the first embodiment to the fifth embodiment respectively. The radius of curvature on the optical axis and the lens surface spacing of the composing lens are shown as values when the value of the composite focal lengths f of the imaging lens is normalized to 1.00 mm.

In the first embodiment to the fifth embodiment, a transparent curable silicone resin, which is a curable resin material, is used for the material of the first lens $L_1$ and the third lens $L_3$ constituting the first junction type compound lens 14, the material of the fourth lens $L_4$ and the sixth lens $L_6$ constituting the second junction type compound lens 16, and the seventh lens $L_7$ and the ninth lens $L_9$ constituting the third junction type compound lens 18. An optical glass (e.g. BK7), which is a glass material, is used for the material of the second lens $L_2$, the fifth lens $L_5$ and the eighth lens $L_8$. Here BK7 is a name assigned by Schott Glass Co. to a borosilicate glass group. The optical glass BK7 is now being manufactured by a plurality of glass manufacturers.

The refractive index and the Abbe number of commercially available optical glass BK7 are somewhat different depending on the manufacturer and the manufactured lot. The refractive index of the optical glass BK7 (made by Ohara Inc.), constituting the second lens $L_2$, the fifth lens $L_5$ and the eighth lens $L_8$ with respect to the d-line (light with a 587.6 nm wavelength), is 1.51633, and the Abbe number is 64.0.

The curable resin material here refers to both a thermo-setting resin material and a UV-curable resin material.

The transparent curable silicone resin refers to a silicone resin which is transparent to visible light, and with which the geometric shape of a lens does not change, and the optical performance thereof does not deteriorate even if the environment temporarily becomes about a 150° C. high temperature. The transparent curable silicone resin can be selected from appropriate silicone resins commercially available under the description "transparent high hardness silicone resin" among products on the market from silicone resin supply companies.

The first lens $L_1$ and the second lens $L_2$ are directly bonded, and the second lens $L_2$ and the third lens $L_3$ are directly bonded. The fourth lens $L_4$ and the fifth lens $L_5$ are directly bonded, and the fifth lens $L_5$ and the sixth lens $L_6$ are directly bonded. The seventh lens $L_7$ and the eighth lens $L_8$ are directly bonded, and the eighth lens $L_8$ and the ninth lens $L_9$ are directly bonded.

For the curable resin material of the first lens $L_1$, the third lens $L_3$, the fourth lens $L_4$, the sixth lens $L_6$, the seventh lens $L_7$ and the ninth lens $L_9$, SMX-7852 and SMX-7877 made by Fuji Polymer Industries Co. Ltd. and SR-7010 made by Dow Corning Toray, Co. Ltd. were used. The refractive index and the Abbe number of these thermo-setting silicone resins differ depending on the manufacturer, and are somewhat different even if the product name is the same. In the following embodiments, the refractive index (value with respect to the d-line (light with 587.6 nm wavelength)) and the Abbe number are shown along with the thermo-setting silicone resin material.

As FIG. 1 shows, the first imaging lens of the present invention comprises a first junction type compound lens 14, a diaphragm S (aperture diaphragm), a second junction type compound lens 16 and a third junction type compound lens 18, and are arranged in the sequence of the first junction type compound lens 14, the diaphragm S, the second junction type compound lens 16, and the third junction type compound lens 18 from the object side to the image side.

As FIG. 6 shows, the second imaging lens of the present invention comprises a first diaphragm $S_1$, a first junction type compound lens 14, a second diaphragm $S_2$, a second junction type compound lens 16, and a third junction type compound lens 18, and are arranged in the sequence of the first diaphragm $S_1$, the first junction type compound lens 14, the second diaphragm $S_2$, the second junction type compound lens 16, and the third junction type compound lens 18.

In the first junction type compound lens 14, a first lens $L_1$, a second lens $L_2$ and a third lens $L_3$ are arranged in this sequence from the object side to the image side. In the second junction type compound lens 16, a fourth lens $L_4$, a fifth lens $L_5$ and a sixth lens $L_6$ are arranged in this sequence from the object side to the image side. In the third junction type compound lens 18, a seventh lens $L_7$, an eighth lens $L_8$ and a ninth lens $L_9$ are arranged in this sequence from the object side to the image side.

A cover glass 12 is inserted between the third junction type compound lens 18 and an image sensing element 10. A material of the cover glass 12 is optical glass BK7 (made by Hoya Corporation) of which refractive index is 1.51633 and the Abbe number is 64.0. In the later mentioned Table 1 to Table 5, the refractive index and the Abbe number of the cover glass 12 are N=1.51633 and ν=64.0 respectively.

Table 1 to Table 5 show the value $r_i$ (i=1, 2, 3, . . . , 16) of the radius of curvature on the optical axis, surface spacing $d_i$ (i=1, 2, 3, . . . , 16), and refractive index, Abbe number and aspherical surface coefficient of the lens composing material of the imaging lens according to the first embodiment to the fifth embodiment respectively. Here the combined focal lengths of the lens system of the first junction type compound lens, the second junction type compound lens and the third junction type compound lens is normalized to 1.00 mm.

The object side face of the first lens $L_1$ and the image side face of the third lens $L_3$ constituting the first junction type compound lens 14 have aspherical surfaces, the object side face of the fourth lens $L_4$ and the image side face of the sixth lens $L_6$ constituting the second junction type compound lens 16 have aspherical surfaces, and the object side face of the seventh lens $L_7$ and the image side face of the ninth lens $L_9$ constituting the third junction type compound lens 18 have aspherical surfaces.

TABLE 1

First Embodiment

| Radius of Curvature($r_i$) | Interval($d_i$) | Refractive Index($N_j$) | Abbe Number($v_j$) | Aspherical Surface Coefficients | | | | |
|---|---|---|---|---|---|---|---|---|
| | | | | K | $A_4$ | $A_6$ | $A_8$ | $A_{10}$ |
| $r_1$ = 0.290 | | | | 2.679e−1 | −3.062e−1 | 3.708 | −9.974e+1 | 3.512e+3 |
| | $d_1$ = 0.1553 | $N_1$ = 1.51000 | $v_1$ = 56.0 | | | | | |
| $r_2$ = ∞ | | | | | | | | |
| | $d_2$ = 0.0945 | $N_2$ = 1.51633 | $v_2$ = 64.0 | | | | | |
| $r_3$ = ∞ | | | | | | | | |
| | $d_3$ = 0.0105 | $N_3$ = 1.51000 | $v_3$ = 56.0 | | | | | |
| $r_4$ = 0.661 | | | | 1.087e+1 | 3.263 | −6.012e+1 | −1.969e+3 | 2.877e+5 |
| | $d_4$ = 0.0144 | | | | | | | |
| $r_5$ = ∞ | | | | | | | | |
| | $d_5$ = 0.0589 | | | | | | | |
| $r_6$ = −0.307 | | | | 4.656e−1 | 5.992 | −1.188e+3 | 1.130e+5 | −4.010e+6 |
| | $d_6$ = 0.0057 | $N_4$ = 1.51000 | $v_4$ = 56.0 | | | | | |
| $r_7$ = ∞ | | | | | | | | |
| | $d_7$ = 0.1574 | $N_5$ = 1.51633 | $v_5$ = 64.0 | | | | | |
| $r_8$ = ∞ | | | | | | | | |
| | $d_8$ = 0.0735 | $N_6$ = 1.51000 | $v_6$ = 56.0 | | | | | |
| $r_9$ = −0.372 | | | | −2.627e−1 | 9.387 | −1.849 | −1.329e+1 | −2.264e+3 |
| | $d_9$ = 0.0355 | | | | | | | |
| $r_{10}$ = 2.495 | | | | 3.033e+1 | 8.360e−1 | 1.675 | −7.945 | −3.142e+1 |
| | $d_{10}$ = 0.0738 | $N_7$ = 1.51000 | $v_7$ = 56.0 | | | | | |
| $r_{11}$ = ∞ | | | | | | | | |
| | $d_{11}$ = 0.0839 | $N_8$ = 1.51633 | $v_8$ = 64.0 | | | | | |
| $r_{12}$ = ∞ | | | | | | | | |
| | $d_{12}$ = 0.0315 | $N_9$ = 1.51000 | $v_9$ = 56.0 | | | | | |
| $r_{13}$ = 1.839 | | | | −2.401e+1 | −5.705 | 3.180e+1 | −9.030e+1 | 1.766e+2 |
| | $d_{13}$ = 0.2295 | | | | | | | |
| $r_{14}$ = ∞ | | | | | | | | |
| | $d_{14}$ = 0.1049 | N = 1.51633 | v = 64.0 | | | | | |
| $r_{15}$ = ∞ | | | | | | | | |
| | $d_{15}$ = 0.1000 | | | | | | | |

Focal Distance f = 1.00 mm
F-Number $F_{no}$ = 3.40
Image Height 2Y = 1.172 mm

TABLE 2

Second Embodiment

| Radius of Curvature($r_i$) | Interval($d_i$) | Refractive Index($N_j$) | Abbe Number($v_j$) | Aspherical Surface Coefficients | | | | |
|---|---|---|---|---|---|---|---|---|
| | | | | K | $A_4$ | $A_6$ | $A_8$ | $A_{10}$ |
| $r_1$ = ∞ | | | | | | | | |
| | $d_1$ = 0.0000 | | | | | | | |
| $r_2$ = 0.324 | | | | 1.102 | −5.858 | −1.033e+2 | 3.814e+3 | −2.282e+5 |
| | $d_2$ = 0.0694 | $N_1$ = 1.51000 | $v_1$ = 56.0 | | | | | |
| $r_3$ = ∞ | | | | | | | | |
| | $d_3$ = 0.0785 | $N_2$ = 1.51633 | $v_2$ = 64.0 | | | | | |
| $r_4$ = ∞ | | | | | | | | |
| | $d_4$ = 0.0262 | $N_3$ = 1.51000 | $v_3$ = 56.0 | | | | | |
| $r_5$ = −51.004 | | | | 1.791e+4 | −8.623 | −1.712e+1 | −4.432e+3 | −1.243e+5 |
| | $d_5$ = 0.0219 | | | | | | | |
| $r_6$ = ∞ | | | | | | | | |
| | $d_6$ = 0.0890 | | | | | | | |
| $r_7$ = −0.216 | | | | 1.473e−1 | 1.714e+1 | 2.890e+2 | 1.357e+3 | −3.232e+5 |
| | $d_7$ = 0.0157 | $N_4$ = 1.51000 | $v_4$ = 56.0 | | | | | |
| $r_8$ = ∞ | | | | | | | | |
| | $d_8$ = 0.0654 | $N_5$ = 1.51633 | $v_5$ = 64.0 | | | | | |
| $r_9$ = ∞ | | | | | | | | |
| | $d_9$ = 0.0393 | $N_6$ = 1.51000 | $v_6$ = 56.0 | | | | | |
| $r_{10}$ = −0.318 | | | | −1.587 | 5.267 | 5.294e+2 | −5.318e+3 | 1.001e+4 |
| | $d_{10}$ = 0.0953 | | | | | | | |
| $r_{11}$ = 0.917 | | | | −2.434e+2 | −4.287 | 3.777e+1 | −1.443e+2 | 2.430e+2 |
| | $d_{11}$ = 0.0091 | $N_7$ = 1.51000 | $v_7$ = 56.0 | | | | | |
| $r_{12}$ = ∞ | | | | | | | | |
| | $d_{12}$ = 0.1047 | $N_8$ = 1.51633 | $v_8$ = 64.0 | | | | | |
| $r_{13}$ = ∞ | | | | | | | | |
| | $d_{13}$ = 0.0837 | $N_9$ = 1.51000 | $v_9$ = 56.0 | | | | | |

TABLE 2-continued

Second Embodiment

| Radius of Curvature($r_i$) | Interval($d_i$) | Refractive Index($N_j$) | Abbe Number($\nu_j$) | Aspherical Surface Coefficients | | | | |
|---|---|---|---|---|---|---|---|---|
| | | | | K | $A_4$ | $A_6$ | $A_8$ | $A_{10}$ |
| $r_{14}$ = 0.465 | | | | −2.873e+1 | −3.141 | 9.020e−2 | 2.310e+1 | −1.201e+2 |
| | $d_{14}$ = 0.2022 | | | | | | | |
| $r_{15}$ = ∞ | | | | | | | | |
| | $d_{15}$ = 0.0785 | N = 1.51633 | $\nu$ = 64.0 | | | | | |
| $r_{16}$ = ∞ | | | | | | | | |
| | $d_{16}$ = 0.1000 | | | | | | | |

Focal Distance f = 1.00 mm
F-Number $F_{no}$ = 2.90
Image Height 2Y = 1.260 mm

TABLE 3

Third Embodiment

| Radius of Curvature($r_i$) | Interval($d_i$) | Refractive Index($N_j$) | Abbe Number($\nu_j$) | Aspherical Surface Coefficients | | | | |
|---|---|---|---|---|---|---|---|---|
| | | | | K | $A_4$ | $A_6$ | $A_8$ | $A_{10}$ |
| $r_1$ = ∞ | | | | | | | | |
| | $d_1$ = 0.0000 | | | | | | | |
| $r_2$ = 0.351 | | | | 1.340 | −5.036 | −1.009e+2 | 2.086e+3 | −1.402e+5 |
| | $d_2$ = 0.0597 | $N_1$ = 1.53000 | $\nu_1$ = 35.0 | | | | | |
| $r_3$ = ∞ | | | | | | | | |
| | $d_3$ = 0.0878 | $N_2$ = 1.51633 | $\nu_2$ = 64.0 | | | | | |
| $r_4$ = ∞ | | | | | | | | |
| | $d_4$ = 0.0329 | $N_3$ = 1.53000 | $\nu_3$ = 35.0 | | | | | |
| $r_5$ = −17.554 | | | | 1.062e+4 | −7.948 | −6.007e+1 | −2.578e+3 | −6.919e+4 |
| | $d_5$ = 0.0211 | | | | | | | |
| $r_6$ = ∞ | | | | | | | | |
| | $d_6$ = 0.0940 | | | | | | | |
| $r_7$ = −0.214 | | | | 2.700e−2 | 1.110e+1 | 3.585e+2 | 2.293e+2 | −1.379e+5 |
| | $d_7$ = 0.0147 | $N_4$ = 1.60000 | $\nu_4$ = 30.0 | | | | | |
| $r_8$ = ∞ | | | | | | | | |
| | $d_8$ = 0.0658 | $N_5$ = 1.60342 | $\nu_5$ = 38.0 | | | | | |
| $r_9$ = ∞ | | | | | | | | |
| | $d_9$ = 0.0439 | $N_6$ = 1.60000 | $\nu_6$ = 30.0 | | | | | |
| $r_{10}$ = −0.343 | | | | −5.390e−1 | 5.032e−1 | 4.563e+2 | −3.511e+3 | 8.214e+3 |
| | $d_{10}$ = 0.0987 | | | | | | | |
| $r_{11}$ = 0.614 | | | | −4.296e+1 | −3.386 | 2.668e+1 | −1.135e+2 | 2.311e+2 |
| | $d_{11}$ = 0.0292 | $N_7$ = 1.53000 | $\nu_7$ = 35.0 | | | | | |
| $r_{12}$ = ∞ | | | | | | | | |
| | $d_{12}$ = 0.1097 | $N_8$ = 1.51633 | $\nu_8$ = 64.0 | | | | | |
| $r_{13}$ = ∞ | | | | | | | | |
| | $d_{13}$ = 0.0658 | $N_9$ = 1.53000 | $\nu_9$ = 35.0 | | | | | |
| $r_{14}$ = 0.530 | | | | −2.100e+1 | −3.682 | 1.083e+1 | −3.730e+1 | 3.258e+1 |
| | $d_{14}$ = 0.2477 | | | | | | | |
| $r_{15}$ = ∞ | | | | | | | | |
| | $d_{15}$ = 0.0658 | N = 1.51633 | $\nu$ = 64.0 | | | | | |
| $r_{16}$ = ∞ | | | | | | | | |
| | $d_{16}$ = 0.1000 | | | | | | | |

Focal Distance f = 1.00 mm
F-Number $F_{no}$ = 2.96
Image Height 2Y = 1.262 mm

TABLE 4

Fourth Embodiment

| Radius of Curvature($r_i$) | Interval($d_i$) | Refractive Index($N_j$) | Abbe Number($\nu_j$) | Aspherical Surface Coefficients | | | | |
|---|---|---|---|---|---|---|---|---|
| | | | | K | $A_4$ | $A_6$ | $A_8$ | $A_{10}$ |
| $r_1$ = 0.295 | | | | 2.680e−1 | −2.911e−1 | 3.410 | −8.867e+1 | 3.019e+3 |
| | $d_1$ = 0.0596 | $N_1$ = 1.51000 | $\nu_1$ = 56.0 | | | | | |
| $r_2$ = 0.344 | | | | | | | | |
| | $d_2$ = 0.1945 | $N_2$ = 1.51633 | $\nu_2$ = 64.0 | | | | | |
| $r_3$ = 1.475 | | | | | | | | |
| | $d_3$ = 0.0108 | $N_3$ = 1.51000 | $\nu_3$ = 56.0 | | | | | |

TABLE 4-continued

Fourth Embodiment

| Radius of Curvature($r_i$) | Interval($d_i$) | Refractive Index($N_j$) | Abbe Number($\nu_j$) | Aspherical Surface Coefficients | | | | |
|---|---|---|---|---|---|---|---|---|
| | | | | K | $A_4$ | $A_6$ | $A_8$ | $A_{10}$ |
| $r_4 = 0.672$ | | | | 1.088e+1 | 3.103 | −5.527e+1 | −1.750e+3 | 2.473e+5 |
| | $d_4 = 0.0147$ | | | | | | | |
| $r_5 = \infty$ | | | | | | | | |
| | $d_5 = 0.0599$ | | | | | | | |
| $r_6 = -0.312$ | | | | 4.656e−1 | 5.697 | −1.092e+3 | 1.005e+5 | −3.447e+6 |
| | $d_6 = 0.0058$ | $N_4 = 1.51000$ | $\nu_4 = 56.0$ | | | | | |
| $r_7 = -0.984$ | | | | | | | | |
| | $d_7 = 0.1994$ | $N_5 = 1.51633$ | $\nu_5 = 64.0$ | | | | | |
| $r_8 = -0.787$ | | | | | | | | |
| | $d_8 = 0.0354$ | $N_6 = 1.51000$ | $\nu_6 = 56.0$ | | | | | |
| $r_9 = -0.378$ | | | | −2.630e−1 | 8.926 | −1.700 | −1.181e+1 | −1.946e+3 |
| | $d_9 = 0.0361$ | | | | | | | |
| $r_{10} = 2.538$ | | | | 3.033e+1 | 7.948e−1 | 1.540 | −7.063 | −2.701e+1 |
| | $d_{10} = 0.0357$ | $N_7 = 1.51000$ | $\nu_7 = 56.0$ | | | | | |
| $r_{11} = 2.360$ | | | | | | | | |
| | $d_{11} = 0.1444$ | $N_8 = 1.51633$ | $\nu_8 = 64.0$ | | | | | |
| $r_{12} = -2.262$ | | | | | | | | |
| | $d_{12} = 0.0124$ | $N_9 = 1.51000$ | $\nu_9 = 56.0$ | | | | | |
| $r_{13} = 1.871$ | | | | −2.401e+1 | −5.424 | 2.924e+1 | −8.027e+1 | 1.518e+2 |
| | $d_{13} = 0.2200$ | | | | | | | |
| $r_{14} = \infty$ | | | | | | | | |
| | $d_{14} = 0.1067$ | $N = 1.51633$ | $\nu = 64.0$ | | | | | |
| $r_{15} = \infty$ | | | | | | | | |
| | $d_{15} = 0.1001$ | | | | | | | |

Focal Distance f = 1.00 mm
F-Number $F_{no}$ = 3.40
Image Height 2Y = 1.144 mm

TABLE 5

Fifth Embodiment

| Radius of Curvature($r_i$) | Interval($d_i$) | Refractive Index($N_j$) | Abbe Number($\nu_j$) | Aspherical Surface Coefficients | | | | |
|---|---|---|---|---|---|---|---|---|
| | | | | K | $A_4$ | $A_6$ | $A_8$ | $A_{10}$ |
| $r_1 = \infty$ | | | | | | | | |
| | $d_1 = 0.0000$ | | | | | | | |
| $r_2 = 0.325$ | | | | 1.102 | −5.758 | −1.004e+2 | 3.664e+3 | −2.166e+5 |
| | $d_2 = 0.0509$ | $N_1 = 1.51000$ | $\nu_1 = 56.0$ | | | | | |
| $r_3 = 1.421$ | | | | | | | | |
| | $d_3 = 0.1074$ | $N_2 = 1.51633$ | $\nu_2 = 64.0$ | | | | | |
| $r_4 = -0.947$ | | | | | | | | |
| | $d_4 = 0.0168$ | $N_3 = 1.51000$ | $\nu_3 = 56.0$ | | | | | |
| $r_5 = -51.298$ | | | | 1.791e+4 | −8.476 | −1.663e+1 | −4.257e+3 | −1.180e+5 |
| | $d_5 = 0.0221$ | | | | | | | |
| $r_6 = \infty$ | | | | | | | | |
| | $d_6 = 0.0895$ | | | | | | | |
| $r_7 = -0.218$ | | | | 1.473e−1 | 1.684e+1 | 2.808e+2 | 1.304e+3 | −3.068e+5 |
| | $d_7 = 0.0158$ | $N_4 = 1.51000$ | $\nu_4 = 56.0$ | | | | | |
| $r_8 = -0.379$ | | | | | | | | |
| | $d_8 = 0.0848$ | $N_5 = 1.51633$ | $\nu_5 = 64.0$ | | | | | |
| $r_9 = -0.947$ | | | | | | | | |
| | $d_9 = 0.0206$ | $N_6 = 1.51000$ | $\nu_6 = 56.0$ | | | | | |
| $r_{10} = -0.320$ | | | | −1.587 | 5.177 | 5.144e+2 | −5.108e+3 | 9.503e+3 |
| | $d_{10} = 0.0958$ | | | | | | | |
| $r_{11} = 0.923$ | | | | −2.434e+2 | −4.214 | 3.670e+1 | −1.386e+2 | 2.307e+2 |
| | $d_{11} = 0.0284$ | $N_7 = 1.51000$ | $\nu_7 = 56.0$ | | | | | |
| $r_{12} = -4.735$ | | | | | | | | |
| | $d_{12} = 0.1524$ | $N_8 = 1.51633$ | $\nu_8 = 64.0$ | | | | | |
| $r_{13} = -1.894$ | | | | | | | | |
| | $d_{13} = 0.0179$ | $N_9 = 1.51000$ | $\nu_9 = 56.0$ | | | | | |

TABLE 5-continued

Fifth Embodiment

| Radius of Curvature($r_i$) | Interval($d_i$) | Refractive Index($N_j$) | Abbe Number($v_j$) | Aspherical Surface Coefficients | | | | |
|---|---|---|---|---|---|---|---|---|
| | | | | K | $A_4$ | $A_6$ | $A_8$ | $A_{10}$ |
| $r_{14}$ = 0.467 | | | | −2.873e+1 | −3.087 | 8.764e−2 | 2.219e+1 | −1.141e+2 |
| | $d_{14}$ = 0.1980 | | | | | | | |
| $r_{15}$ = ∞ | | | | | | | | |
| | $d_{15}$ = 0.0788 | N = 1.51633 | v = 64.0 | | | | | |
| $r_{16}$ = ∞ | | | | | | | | |
| | $d_{16}$ = 0.1000 | | | | | | | |

Focal Distance f = 1.00 mm
F-Number $F_{no}$ = 2.80
Image Height 2Y = 1.240 mm

FIRST EMBODIMENT

First Embodiment is an embodiment of the first imaging lens of the present invention, where the first lens $L_1$, a the third lens $L_3$, the fourth lens $L_4$, the sixth lens $L_6$, the seventh lens $L_7$ and the ninth lens $L_9$ are formed of transparent curable silicone resin SMX-7852 (made by Fuji Polymer Industries Co. Ltd.) containing transparent adhesive, and the second lens $L_2$, the fifth lens $L_5$ and the eighth lens $L_8$ are formed of optical glass BK7 (made by Ohara Inc.).
(A) The refractive index $N_1$ of the first lens $L_1$ is $N_1$=1.51000.
(B) The refractive index $N_2$ of the second lens $L_2$ is $N_2$=1.51633.
(C) The refractive index $N_3$ of the third lens $L_3$ is $N_3$=1.51000.
(D) The Abbe number $v_1$ of the first lens $L_1$ is $v_1$=56.0.
(E) The Abbe number $v_2$ of the second lens $L_2$ is $v_2$=64.0.
(F) The Abbe number $v_3$ of the third lens $L_3$ is $v_3$=56.0.
(G) The refractive index $N_4$ of the fourth lens $L_4$ is $N_4$=1.51000.
(H) The refractive index $N_5$ of the fifth lens $L_5$ is $N_5$=1.51633.
(I) The refractive index $N_6$ of the sixth lens $L_6$ is $N_6$=1.51000.
(J) The Abbe number $v_4$ of the fourth lens $L_4$ is $v_4$=56.0.
(K) The Abbe number $v_5$ of the fifth lens $L_5$ is $v_5$=64.0.
(L) The Abbe number $v_6$ of the sixth lens $L_6$ is $v_6$=56.0
(M) The refractive index $N_7$ of the seventh lens $L_7$ is $N_7$=1.51000.
(N) The refractive index $N_8$ of the eighth lens $L_8$ is $N_8$=1.51633.
(O) The refractive index $N_9$ of the ninth lens $L_9$ is $N_9$=1.51000.
(P) The Abbe number $v_7$ of the seventh lens $L_7$ is $v_7$=56.0.
(Q) The Abbe number $v_8$ of the eighth lens $L_8$ is $v_8$=64.0.
(R) The Abbe number $v_9$ of the ninth lens $L_9$ is $v_9$=56.0.
Therefore $|N_2-N_1|=|N_2-N_3|=|N_5-N_4|=|N_5-N_6|=|N_8-N_7|=|N_8-N_9|$=0.00633, which satisfies the following Conditions (1), (2), (5), (6), (9) and (10). Also $|v_2-v_1|=|v_2-v_3|=|v_5-v_4|=|v_5-v_6|=|v_8-v_7|=|v_8-v_9|$=8.0, which satisfies the following Conditions (3), (4), (7), (8), (11) and (12).

Conditions (1), (2), (5), (6), (9) and (10) refer to the conditions given by the following Expressions (1), (2), (5), (6), (9) and (10). Conditions (3), (4), (7), (8), (11) and (12) refer to the conditions given by the following Expressions (3), (4), (7), (8), (11) and (12).

$$0 \leq |N_2-N_1| \leq 0.1 \quad (1)$$

$$0 \leq |N_2-N_3| \leq 0.1 \quad (2)$$

$$0 \leq |v_2-v_1| \leq 30.0 \quad (3)$$

$$0 \leq |v_2-v_3| \leq 30.0 \quad (4)$$

$$0 \leq |N_5-N_4| \leq 0.1 \quad (5)$$

$$0 \leq |N_5-N_6| \leq 0.1 \quad (6)$$

$$0 \leq |v_5-v_4| \leq 30.0 \quad (7)$$

$$0 \leq |v_5-v_6| \leq 30.0 \quad (8)$$

$$0 \leq |N_8-N_7| \leq 0.1 \quad (9)$$

$$0 \leq |N_8-N_9| \leq 0.1 \quad (10)$$

$$0 \leq |v_8-v_7| \leq 30.0 \quad (11)$$

$$0 \leq |v_8-v_9| \leq 30.0 \quad (12)$$

Conditions (1) to (12) refer to the conditions given by Expressions (1) to (12) respectively, which are the same for the description herein below (description on the second embodiment to the fifth embodiment).

Figure 2:
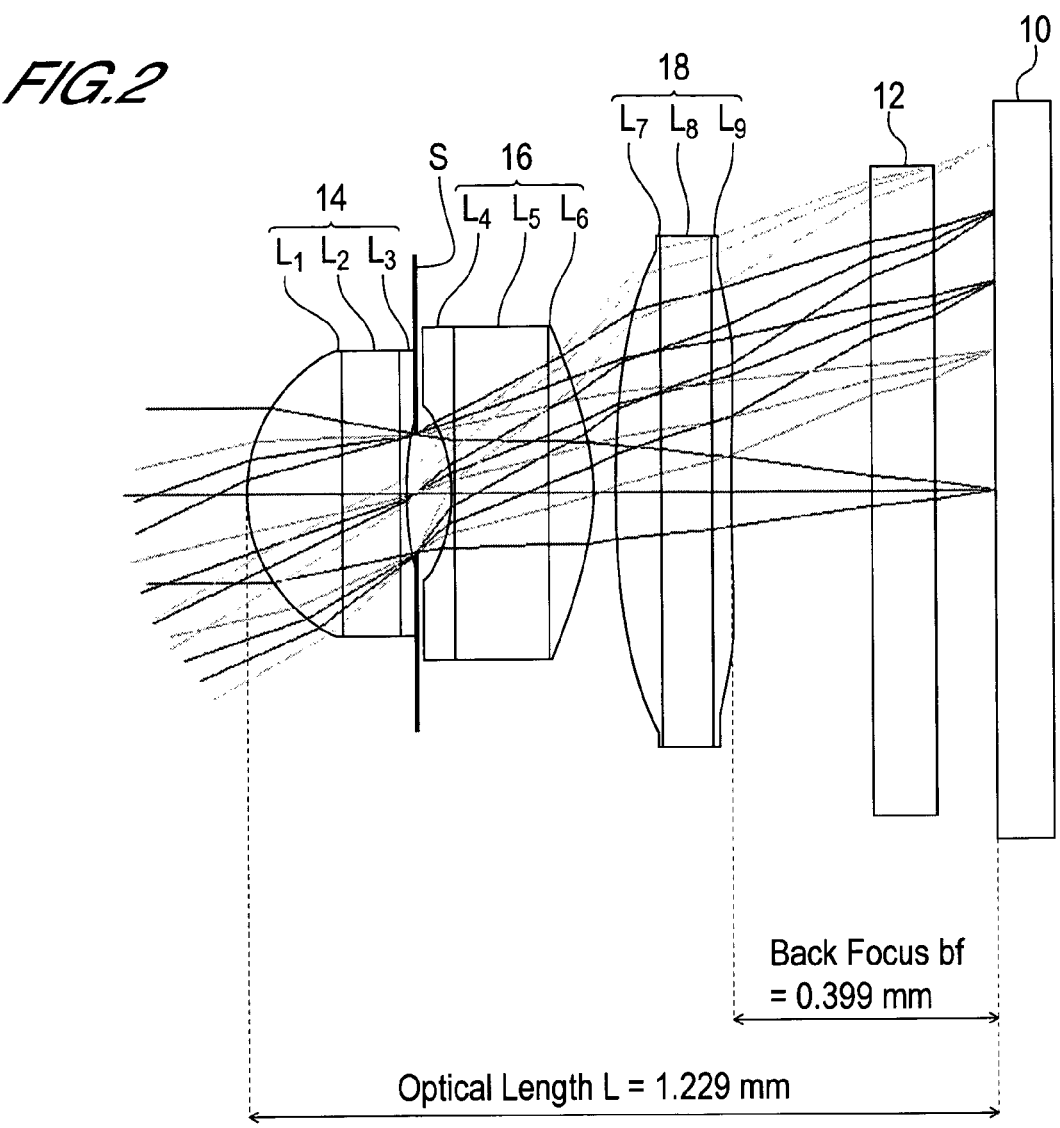
FIG. 2 is a cross-sectional view depicting an imaging lens according to a first embodiment.

FIG. 2 shows a cross-sectional view of the imaging lens of the first embodiment. As FIG. 2 shows, the aperture diaphragm S is disposed between the first junction type compound lens 14 and the second junction type compound lens 16. The diaphragm surface of the aperture diaphragm S is a plane, so $r_5$=∞ is indicated in Table 1. The F number Fno is 3.40.

As Table 1 shows, $r_2$=∞ and $r_3$=∞, so the second lens $L_2$ is a plane parallel glass plate, and since $r_7$=∞ and $r_8$=∞, the fifth lens $L_5$ is a plane parallel glass plate, and since $r_{11}$=∞ and $r_{12}$=∞, the eighth lens $L_8$ is a plane parallel glass plate.

Since $r_1$ is a positive value and $r_4$ is a positive value, the first lens $L_1$ is a plano-convex lens where the object side face of this first lens $L_1$ is a convex surface facing the object side on a paraxial line, and the third lens $L_3$ is a plano-concave lens where the image side face of this third lens $L_3$ is a concave surface facing the image side on a paraxial line. Since $r_6$ is a negative value and $r_9$ is also a negative value, the fourth lens $L_4$ is a plano-concave lens where the object side face of the fourth lens $L_4$ is a concave surface facing the object side on a paraxial line, and the sixth lens $L_6$ is a plano-convex lens where the image side face of this sixth lens $L_6$ is a convex surface facing the image side on a paraxial line. Since $r_{10}$ is a positive value and $r_{13}$ is also a positive value, the seventh lens $L_7$ is a plano-convex lens where the object side of this seventh lens $L_7$ is a convex surface facing the object side on a paraxial line, and the ninth lens $L_9$ is a plano-concave lens where the image side face of this ninth lens $L_9$ is a concave surface facing the image side.

As FIG. 2 shows, the optical length L with respect to the focal lengths f=1.00 mm is 1.229 mm, and the back focus bf is 0.399 mm.

Figure 3:
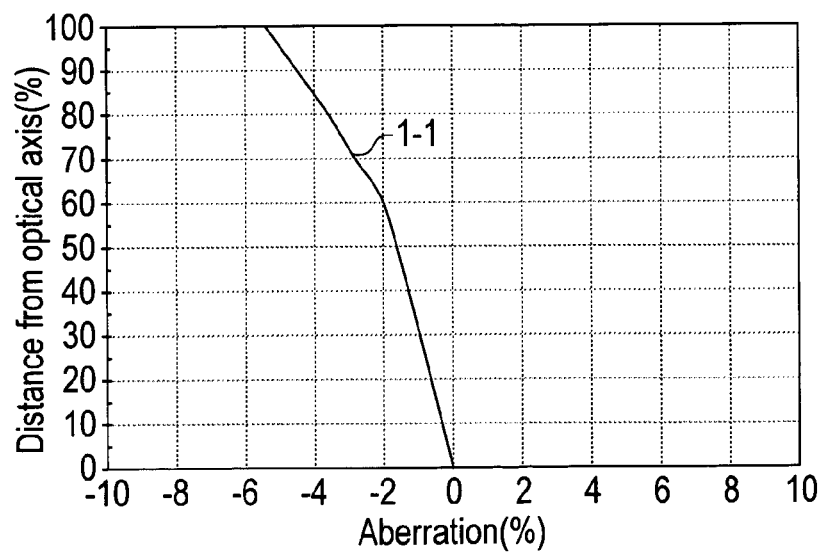
FIG. 3 is a diagram depicting the distortion aberration of the imaging lens of the first embodiment.
Figure 4:
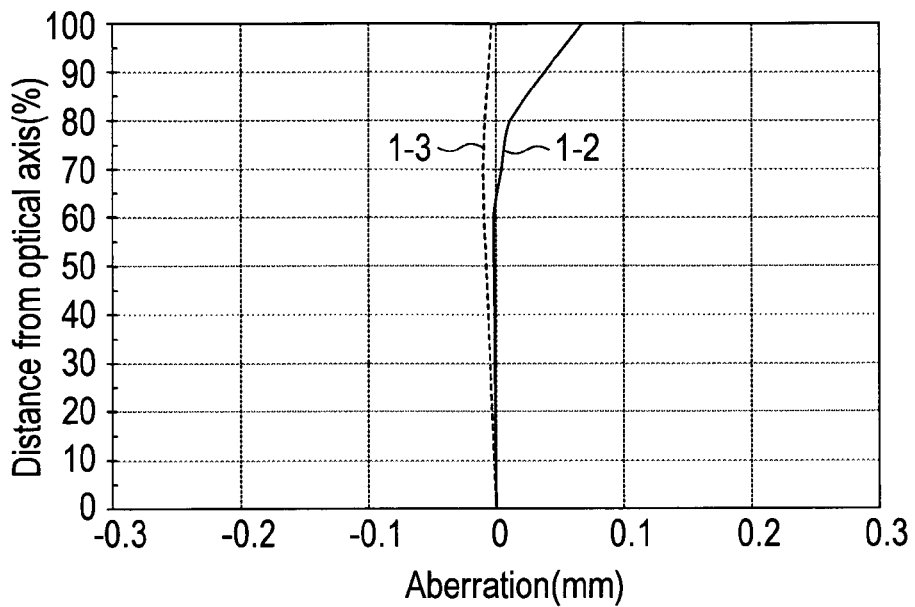
FIG. 4 is a diagram depicting the astigmatism aberration of the imaging lens of the first embodiment.
Figure 5:
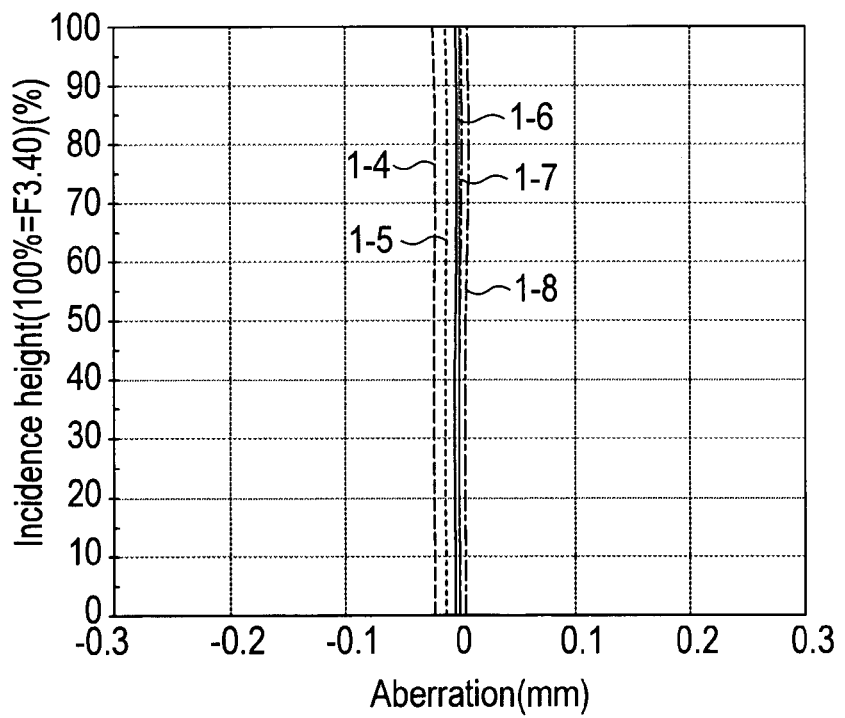
FIG. 5 is a diagram depicting the chromatic/spherical aberration of the imaging lens of the first embodiment.

FIG. 3 shows a graph of the distortion aberration curve 1-1, FIG. 4 shows a graph of the astigmatism aberration curve (aberration curve 1-2 on the meridional surface and aberration curve 1-3 on the sagittal surface), and FIG. 5 shows a graph of a chromatic/spherical aberration curve (aberration curve 1-4 on a g-line, aberration curve 1-5 on an F-line, aberration curve 1-6 on an e-line, aberration curve 1-7 on a d-line, and aberration curve 1-8 on a C-line).

The vertical axes of the aberration curves in FIG. 3 and FIG. 4 show the image height by a % of the distance from the optical axis. In FIG. 3 and FIG. 4, 100% corresponds to 0.586 mm. The vertical axis of the aberration curve in FIG. 5 shows the incidence height h (F number), and the maximum thereof corresponds to 3.40. The horizontal axis of FIG. 3 shows the aberration (%), and the horizontal axis of FIG. 4 and FIG. 5 shows the value of the aberration (mm).

For the distortion aberration, the absolute value of the aberration is 5.41%, which is the maximum, at the 100% position of the image height (image height: 0.586 mm), and the absolute value of the aberration is within 5.41% in a range where the image height is 0.586 mm or less.

For the astigmatism aberration, the absolute value of the aberration is 0.0675 mm, which is the maximum, at the 100% position of the image height (image height: 0.586 mm), and the absolute value of the aberration is within 0.0675 mm in a range where the image height is 0.586 mm or less.

For the chromatic/spherical aberration, the absolute value of the aberration curve 1-4 on a g-line is 0.0234 mm, which is the maximum, at 100% of the incidence height h, and the absolute value of the aberration is within 0.0234 mm.

Therefore according to the imaging lens of the first embodiment, the optical length is short enough to be installed in a portable telephone, and the back focus is long enough to insert such components as a filter and cover glass between the imaging lens and the image sensing plane, and satisfactory images are acquired.

SECOND EMBODIMENT

Second Embodiment is an embodiment of the second imaging lens of the present invention, where the first lens $L_1$, the third lens $L_3$, the fourth lens $L_4$, the sixth lens $L_6$, the seventh lens $L_7$ and the ninth lens $L_9$ are formed of transparent curable silicone resin SMX-7852 (made by Fuji Polymer Industries Co. Ltd) containing transparent adhesive, and the second lens $L_2$, the fifth lens $L_5$ and the eighth lens $L_8$ are formed of optical glass BK7 (made by Ohara Inc.).

Since the respective composing elements of the first—ninth lenses are the same as the above mentioned the first embodiment, $|N_2-N_1|=|N_2-N_3|=|N_5-N_4|=|N_5-N_6|=|N_8-N_7|=|N_8-N_9|=0.00633$, which satisfies the following Conditions (1), (2), (5), (6), (9) and (10). Also $|v_2-v_1|=|v_2-v_3|=|v_5-v_4|=|v_5-v_6|=|v_8-v_7|=|v_8-v_9|=8.0$, which satisfies the following Conditions (3), (4), (7), (8), (11) and (12).

Figure 7:
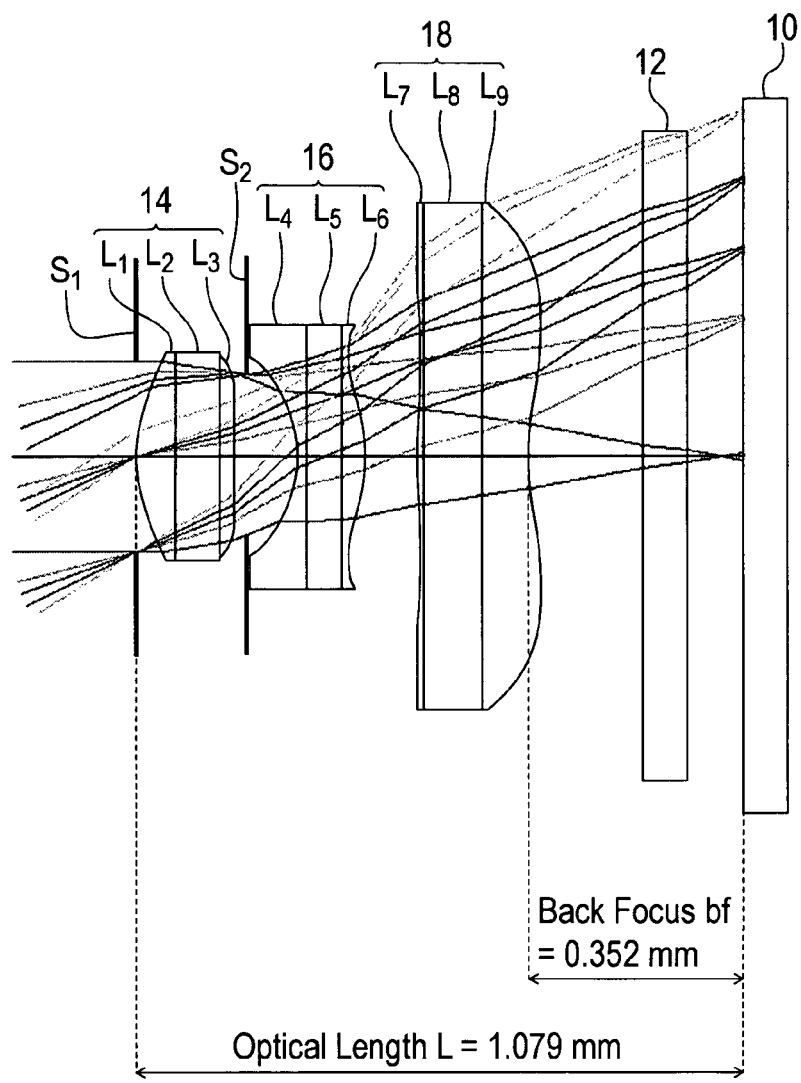
FIG. 7 is a cross-sectional view depicting an imaging lens according to a second embodiment.

FIG. 7 shows a cross-sectional view of the imaging lens of the second embodiment. As FIG. 7 shows, the first diaphragm $S_1$, which plays a role of an aperture diaphragm, is disposed at an intersection of the first surface (surface at object side) of the first lens $L_1$ constituting the first junction type compound lens 14 and the optical axis. The second diaphragm $S_2$, which plays a role of preventing a flare and smear, is disposed between the first junction type compound lens 14 and the second junction type compound lens 16.

The diaphragm surface of the first diaphragm $S_1$ is a plane $r_1$, so $r_1=\infty$ is indicated in Table 2. The second diaphragm $S_2$ is comprised of a plane $r_6$, so $r_6=\infty$ is indicated in Table 2. The F number Fno is 2.90.

As Table 2 shows, $r_3=\infty$ and $r_4=\infty$, so the second lens $L_2$ is a plane parallel glass plate, and since $r_8=\infty$ and $r_9=\infty$, the fifth lens $L_5$ is a plane parallel glass plate, and since $r_{12}=\infty$ and $r_{13}=\infty$, the eighth lens $L_8$ is a plane parallel glass plate.

Since $r_2$ is a positive value and $r_5$ is a positive value, the first lens $L_1$ is a plano-convex lens where the object side face of this first lens $L_1$ is a convex surface facing the object side on a paraxial line, and the third lens $L_3$ is a plano-convex lens where the image side face of this third lens $L_3$ is a convex surface facing the image side on a paraxial line. Since $r_7$ is a negative value and $r_{10}$ is also a negative value, the fourth lens $L_4$ is a plano-concave lens where the object side face of this fourth lens $L_4$ is a concave surface facing the object side on a paraxial line, and the sixth lens $L_6$ is a plano-convex lens where the image side face of this sixth lens $L_6$ is a convex surface facing the image side on a paraxial line. Since $r_{11}$ is a positive value and $r_{14}$ is also a positive value, the seventh lens $L_7$ is a plano-convex lens where the object side face of this seventh lens $L_7$ is a convex surface facing the object side on a paraxial line, and the ninth lens $L_9$ is a plano-concave lens where the image side face of this ninth lens $L_9$ is a concave surface facing the image side on a paraxial line.

As FIG. 7 shows, the optical length L with respect to the focal lengths f=1.00 mm is 1.079 mm, and the back focus bf is 0.352 mm.

Figure 8:
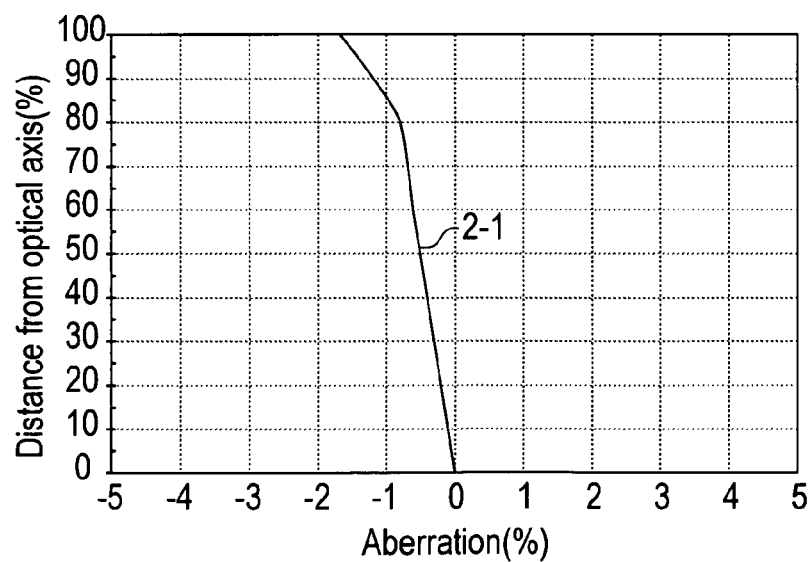
FIG. 8 is a diagram depicting the distortion aberration of the imaging lens of the second embodiment.
Figure 9:
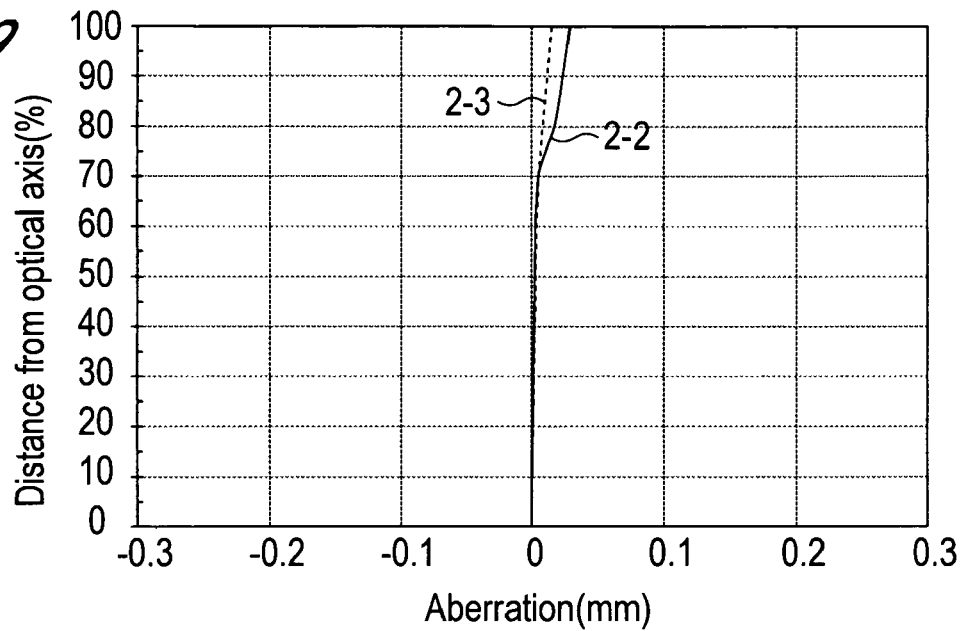
FIG. 9 is a diagram depicting the astigmatism aberration of the imaging lens of the second embodiment.
Figure 10:
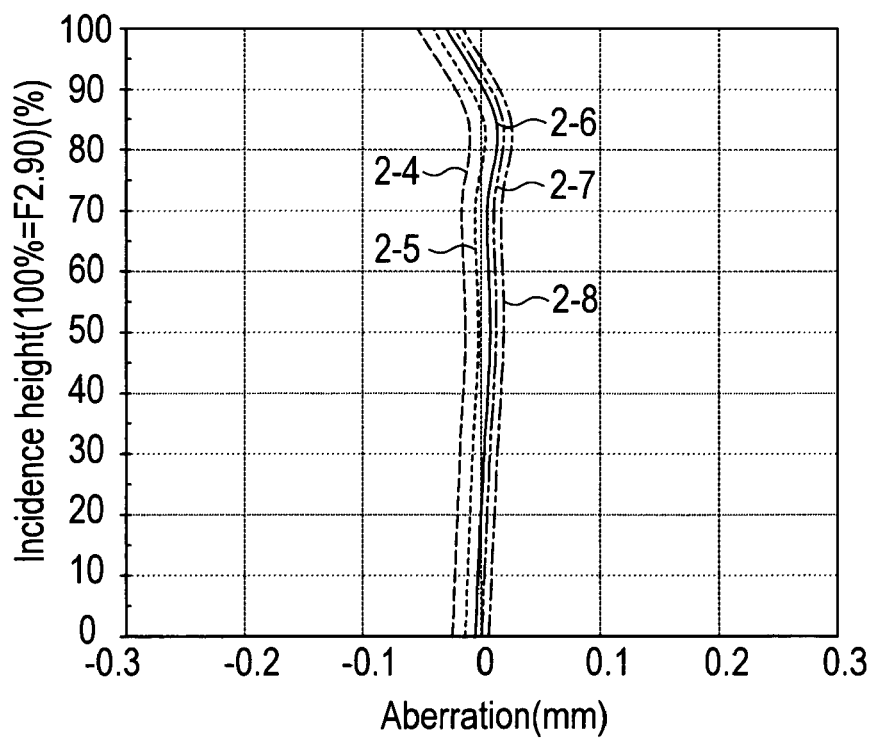
FIG. 10 is a diagram depicting the chromatic/spherical aberration of the imaging lens of the second embodiment.

FIG. 8 shows a graph of the distortion aberration curve 2-1, FIG. 9 shows a graph of the astigmatism aberration curve (aberration curve 2-2 on the meridional surface and aberration curve 2-3 on the sagittal surface), and FIG. 10 shows a graph of a chromatic/spherical aberration curve (aberration curve 2-4 on a g-line, aberration curve 2-5 on an F-line, aberration curve 2-6 on an e-line, aberration curve 2-7 on a d-line, and aberration curve 2-8 on a C-line).

The vertical axes of the aberration curves in FIG. 8 and FIG. 9 show the image height as a % of the distance from the optical axis. In FIG. 8 and FIG. 9, 100% corresponds to 0.630 mm. The vertical axis of the aberration curve in FIG. 10 shows the incidence height h (F number), and the maximum thereof corresponds to 2.90. The horizontal axis of FIG. 8 shows the aberration (%), and the horizontal axes of FIG. 9 and FIG. 10 show the value of the aberration (mm).

For the distortion aberration, the absolute value of the aberration is 1.68%, which is the maximum, at the 100% position of the image height (image height: 0.630 mm), and the absolute value of the aberration is within 1.68% in a range where the image height is 0.630 mm or less.

For the astigmatism aberration, the absolute value of the aberration on the meridional surface is 0.0292 mm, which is the maximum, at the 100% position of the image height (image height: 0.630 mm), and the absolute value of the aberration is within 0.0292 mm in a range where the image height is 0.630 mm or less.

For the chromatic/spherical aberration, the absolute value of the aberration curve 2-4 on a g-line is 0.0534 mm, which is the maximum, at 100% of the incidence height h, and the absolute value of the aberration is within 0.0534 mm.

Therefore according to the imaging lens of the second embodiment, the optical length is short enough to be installed in a portable telephone, and the back focus is long enough to insert such components as a filter and cover glass between the imaging lens and the image sensing plane, and satisfactory images are acquired.

THIRD EMBODIMENT

Third Embodiment is an embodiment of the second imaging lens of the present invention, where the first lens $L_1$, the third lens $L_3$, the seventh lens $L_7$ and the ninth lens $L_9$ are formed of transparent curable silicone resin SR-7010 (made by Dow Corning Toray Co. Ltd.) containing transparent adhesive, the second lens $L_2$ and the eighth lens $L_8$ are formed of optical glass BK7 (made by Ohara Inc.), and the fifth lens $L_5$ is formed of optical glass E-F5 (made by Hoya Corporation). The fourth lens $L_4$ and the sixth lens $L_6$ are formed of transparent curable silicone resin SMX-7877 (made by Fuji Polymer Industries Co. Ltd.) containing transparent adhesive.

(A) The refractive index $N_1$ of the first lens $L_1$ is $N_1$=1.53000.
(B) The refractive index $N_2$ of the second lens $L_2$ is $N_2$=1.51633.
(C) The refractive index $N_3$ of the third lens $L_3$ is $N_3$=1.53000.
(D) The Abbe number $v_1$ of the first lens $L_1$ is $v_1$=35.0.
(E) The Abbe number $v_2$ of the second lens $L_2$ is $v_2$=64.0.
(F) The Abbe number $v_3$ of the third lens $L_3$ is $v_3$=35.0.
(G) The refractive index $N_4$ of the fourth lens $L_4$ is $N_4$=1.60000.
(H) The refractive index $N_5$ of the fifth lens $L_5$ is $N_5$=1.60342.
(I) The refractive index $N_6$ of the sixth lens $L_6$ is $N_6$=1.60000.
(J) The Abbe number $v_4$ of the fourth lens $L_4$ is $v_4$=30.0.
(K) The Abbe number $v_5$ of the fifth lens $L_5$ is $v_5$=38.0.
(L) The Abbe number $v_6$ of the sixth lens $L_6$ is $v_6$=30.0.
(M) The refractive index $N_7$ of the seventh lens $L_7$ is $N_7$=1.53000.
(N) The refractive index $N_8$ of the eighth lens $L_8$ is $N_8$=1.51633.
(O) The refractive index $N_9$ of the ninth lens $L_9$ is $N_9$=1.53000.
(P) The Abbe number $v_7$ of the seventh lens $L_7$ is $v_7$=35.0.
(Q) The Abbe number $v_8$ of the eighth lens $L_8$ is $v_8$=64.0.
(R) The Abbe number $v_9$ of the ninth lens $L_9$ is $v_9$=35.0.

Therefore $|N_2-N_1|=|N_2-N_3|=|N_8-N_7|=|N_8-N_9|=0.01367$, and $|N_5-N_4|=|N_5-N_6|=0.00342$, which satisfies the following Conditions (1), (2), (5), (6), (9) and (10). Also $|v_2-v_1|=|v_2-v_3|=|v_8-v_7|=|v_8-v_9|=29.0$, and $|v_5-v_4|=|v_5-v_6|=8.0$, which satisfies the following Conditions (3), (4), (7), (8), (11) and (12).

Figure 11:
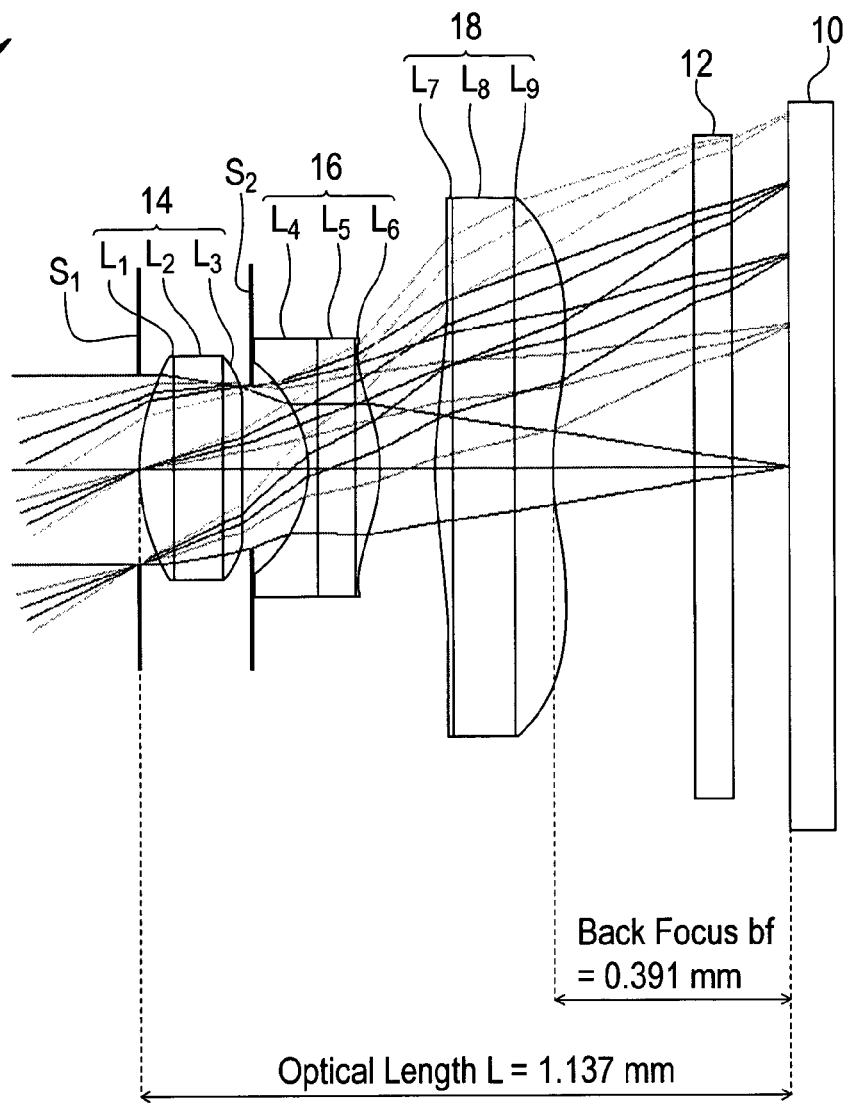
FIG. 11 is a cross-sectional view depicting an imaging lens according to a third embodiment.

FIG. 11 shows a cross-sectional view of the imaging lens of the third embodiment. As FIG. 11 shows, the first diaphragm $S_1$, which plays a role of an aperture diaphragm, is disposed at an intersection of the first surface (surface at the object side) of the first lens $L_1$ constituting the first junction type compound lens 14 and the optical axis. The second diaphragm $S_2$, which plays a role of preventing a flare or smear, is disposed between the first junction type compound lens 14 and the second junction type compound lens 16.

The diaphragm surface of the first diaphragm $S_1$ is a plane $r_1$, so $r_1=\infty$ is indicated in Table 3. The second diaphragm $S_2$ is comprised of a plane $r_6$, so $r_6=\infty$ is indicated in Table 3. The F number Fno is 2.96.

As Table 3 shows, $r_3=\infty$ and $r_4=\infty$, so the second lens $L_2$ is a plane parallel glass plate, and since $r_8=\infty$ and $r_9=\infty$, the fifth lens $L_5$ is a plane parallel glass plate, and since $r_{12}=\infty$ and $r_{13}=\infty$, the eighth lens $L_8$ is a plane parallel glass plate.

Since $r_2$ is a positive value and $r_5$ is a negative value, the first lens $L_1$ is a plano-convex lens where the object side face of this first lens $L_1$ is a convex surface facing the object side on a paraxial line, and the third lens $L_3$ is a plano-convex lens where the image side face of this third lens $L_3$ is a convex surface facing the image side on a paraxial line. Since $r_7$ is a negative value and $r_{10}$ is also a negative value, the fourth lens $L_4$ is a plano-concave lens where the object side face of this fourth lens $L_4$ is a concave surface facing the object side on a paraxial line, and the sixth lens $L_6$ is a plano-convex lens where the image side face of this sixth lens $L_6$ is a convex surface facing the image side on a paraxial line. Since $r_{11}$ is a positive value and $r_{14}$ is also a positive value, the seventh lens $L_7$ is a plano-convex lens where the object side face of this seventh lens $L_7$ is a convex surface facing the object side on a paraxial line, and the ninth lens $L_9$ is a plano-concave lens where the image side face of this ninth lens $L_9$ is a concave surface facing the image side on a paraxial line.

As FIG. 11 shows, the optical length L with respect to the focal lengths f=1.00 mm is 1.137 mm, and the back focus bf is 0.391 mm.

Figure 12:
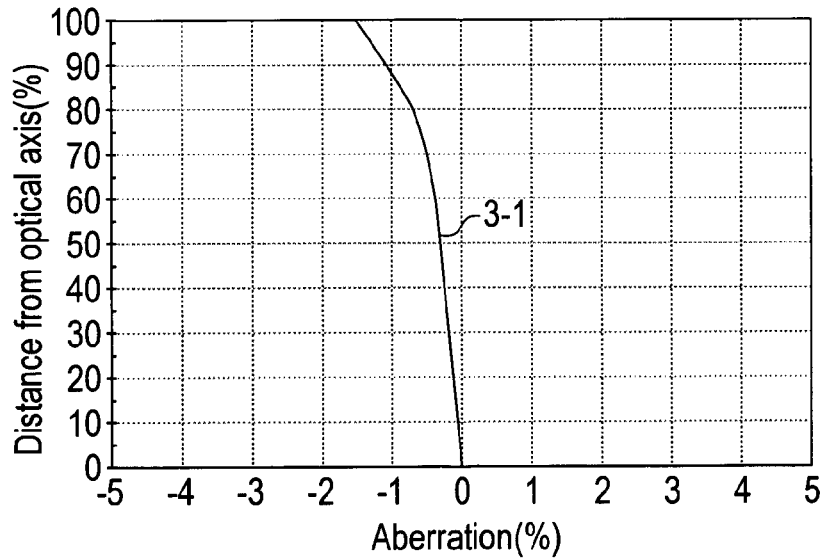
FIG. 12 is a diagram depicting the distortion aberration of the imaging lens of the third embodiment.
Figure 13:
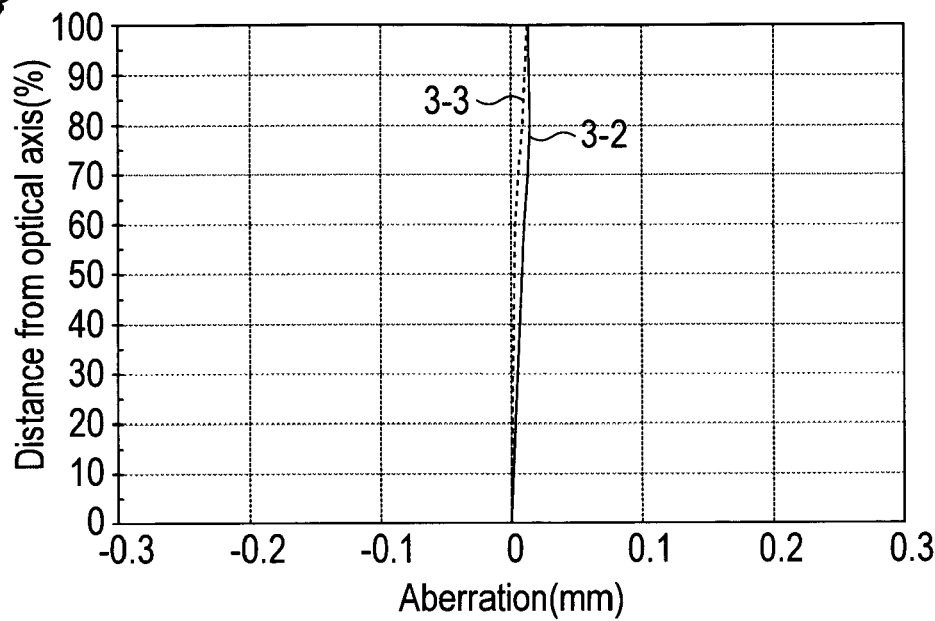
FIG. 13 is a diagram depicting the astigmatism aberration of the imaging lens of the third embodiment.
Figure 14:
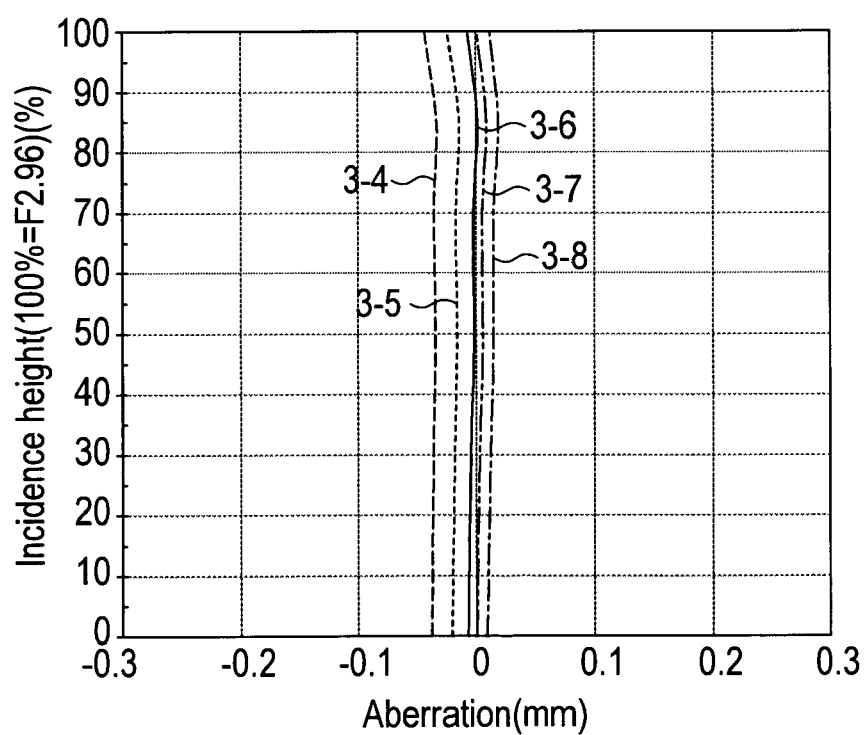
FIG. 14 is a diagram depicting the chromatic/spherical aberration of the imaging lens of the third embodiment.

FIG. 12 shows a graph of the distortion aberration curve 3-1, FIG. 13 shows a graph of the astigmatism aberration curve (aberration curve 3-2 on the meridional surface and the aberration curve 3-3 on the sagittal surface), FIG. 14 shows a graph of a chromatic/spherical aberration curve (aberration curve 3-4 on a g-line, aberration curve 3-5 on an F-line, aberration curve 3-6 on an e-line, aberration curve 3-7 on a d-line, and aberration curve 3-8 on a C-line).

The vertical axes of the aberration curves in FIG. 12 and FIG. 13 show the image height by a % of the distance from the optical axis. In FIG. 12 and FIG. 13, 100% corresponds to 0.631 mm. The vertical axis of the aberration curve in FIG. 14 shows the incidence height h (F number), and the maximum thereof corresponds to 2.96. The horizontal axis of FIG. 12 shows the aberration (%), and the horizontal axes of FIG. 13 and FIG. 14 show the value of the aberration (mm).

For the distortion aberration, the absolute value of the aberration is 1.52%, which is the maximum, at the 100% position of the image height (image height: 0.631 mm), and the absolute value of the aberration is within 1.52% in a range where the image height is 0.631 mm or less.

For the astigmatism aberration, the absolute value of the aberration on the meridional surface is 0.0147 mm, which is the maximum, at the 80% position of the image height (image height: 0.505 mm), and the absolute value of the aberration is within 0.0147 mm in a range where the image height is 0.631 mm or less.

For the chromatic/spherical aberration, the absolute value of the aberration curve 3-4 on a g-line is 0.0435 mm, which is the maximum, at 100% of the incidence height h, and the absolute value of the aberration is within 0.0435 mm.

Therefore according to the imaging lens of the third embodiment, the optical length is short enough to be installed in a portable telephone, and the back focus is long enough to insert such components as a filter and cover glass between the imaging lens and the image sensing plane, and satisfactory images are acquired.

FOURTH EMBODIMENT

Fourth Embodiment is an embodiment of the first imaging lens of the present invention, where the first lens $L_1$, the third lens $L_3$, the fourth lens $L_4$, the sixth lens $L_6$, the seventh lens $L_7$ and the ninth lens $L_9$ are formed of transparent curable silicone resin SMX-7852 (made by Fuji Polymer Industries Co. Ltd.) containing transparent adhesive, and the second lens $L_2$, the fifth lens $L_5$ and the eighth lens $L_8$ are formed of optical glass BK7 (made by Ohara Inc.).

Since the respective composing elements of the first to ninth lenses are the same as the above mentioned the first and second embodiments, $|N_2-N_1|=|N_2-N_3|=|N_5-N_4|=|N_5-N_6|=|N_8-N_7|=|N_8-N_9|=0.00633$, which satisfies the following Conditions (1), (2), (5), (6), (9) and (10). Also $|v_2-v_1|=|v_2-v_3|=|v_5-v_4|=|v_5-v_6|=|v_8-v_7|=|v_8-v_9|=8.0$, which satisfies the following Conditions (3), (4), (7), (8), (11) and (12).

Figure 15:
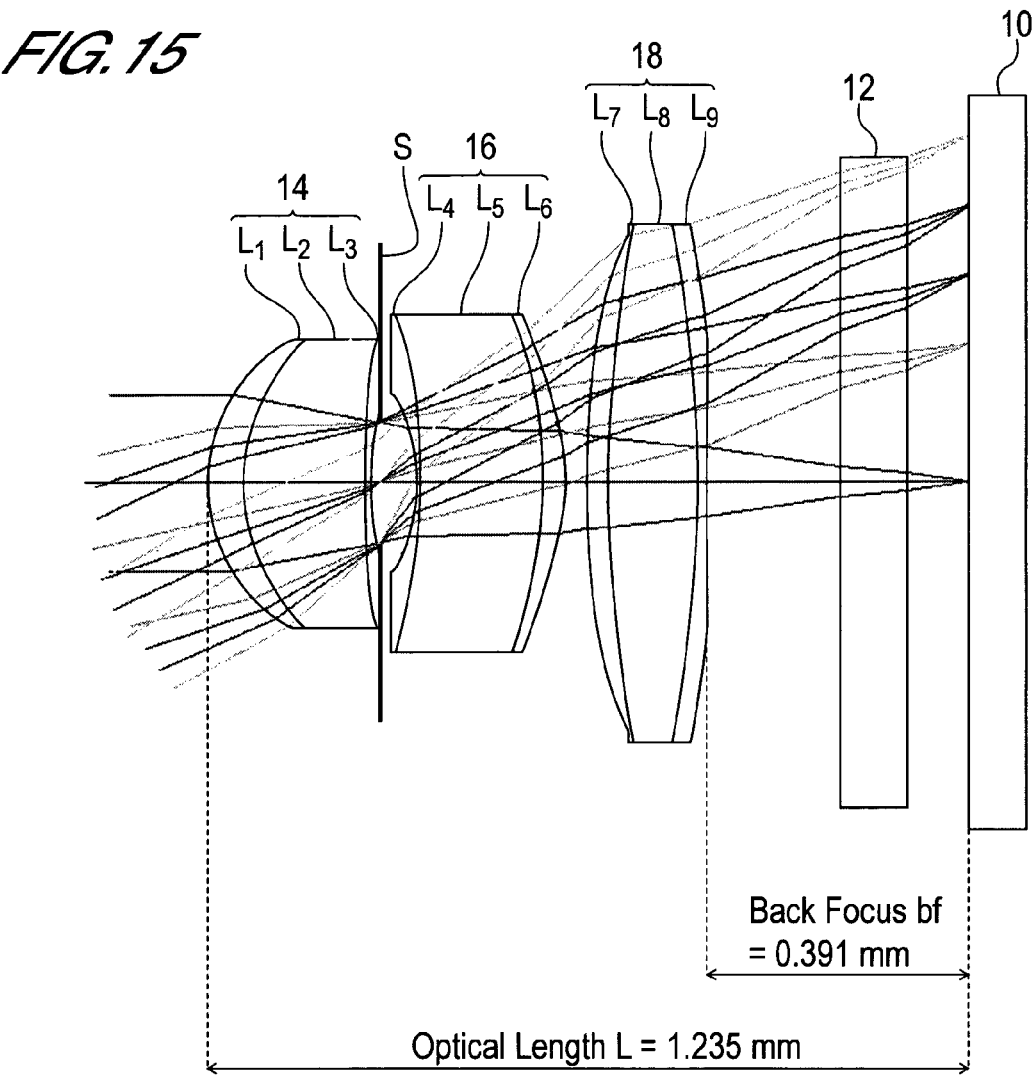
FIG. 15 is a cross-sectional view depicting an imaging lens according to a fourth embodiment.

FIG. 15 shows a cross-sectional view of the imaging lens of the fourth embodiment. As FIG. 15 shows, the aperture diaphragm S is disposed between the first junction type compound lens 14 and the second junction type compound lens 16. The diaphragm surface of the aperture diaphragm S is a plane, so $r_5=\infty$ is indicated in Table 4. The F number Fno is 3.40.

As Table 4 shows, the second lens $L_2$ is a meniscus lens of which convex surface is facing the object side since $r_2$ is a positive value and $r_3$ is also a positive value, the fifth lens $L_5$ is a meniscus lens of which convex surface is facing the image side since $r_7$ is a negative value and $r_8$ is also a negative value, and the eighth lens $L_8$ is a bi-convex lens of which both faces are convex surfaces since $r_{11}$ is a positive value and $r_{12}$ is a negative value.

Since $r_1$ is a positive value, the first lens $L_1$ is a lens where the object side face of this first lens $L_1$ is a convex surface facing the object side on a paraxial line. And since $r_4$ is a positive value, the third lens $L_3$ is a lens where the image side face of this third lens $L_3$ is a concave surface facing the image side on a paraxial line.

Since $r_6$ is a negative value, the fourth lens $L_4$ is a lens where the object side face of this fourth lens $L_4$ is a concave surface facing the object side on a paraxial line. And since $r_9$ is a negative value, the sixth lens $L_6$ is a lens where the image side face of this sixth lens $L_6$ is a convex surface facing the image side on a paraxial line.

Since $r_{10}$ is a positive value, the seventh lens $L_7$ is a lens where the object side face of this seventh lens $L_7$ is a convex surface facing the object side on a paraxial line. Since $r_{13}$ is a positive value, the ninth lens $L_9$ is a lens where the image side face of this ninth lens $L_9$ is a concave surface facing the image side on a paraxial line.

As FIG. 15 shows, the optical length L with respect to the focal lengths f=1.00 mm is 1.235 mm, and the back focus bf is 0.391 mm.

Figure 16:
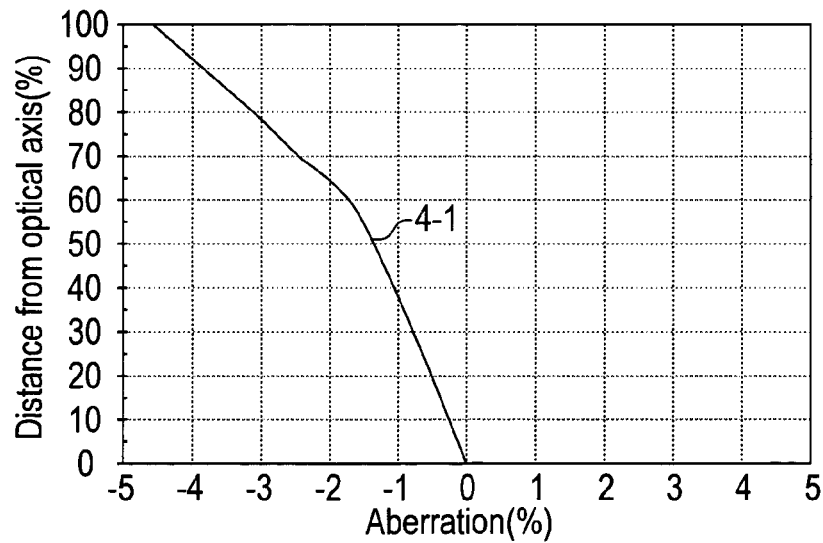
FIG. 16 is a diagram depicting the distortion aberration of the imaging lens of the fourth embodiment.
Figure 17:
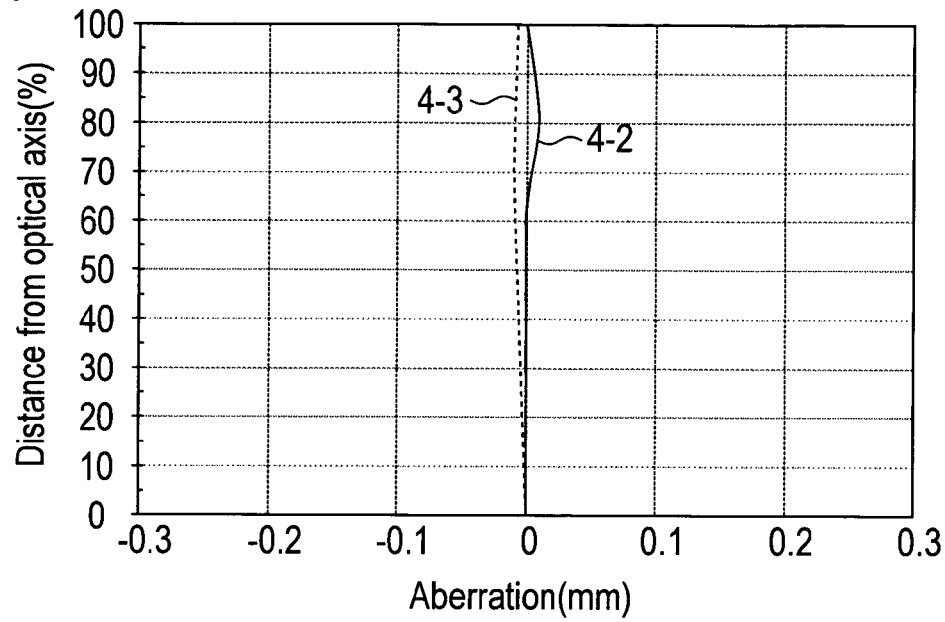
FIG. 17 is a diagram depicting the astigmatism aberration of the imaging lens of the fourth embodiment.
Figure 18:
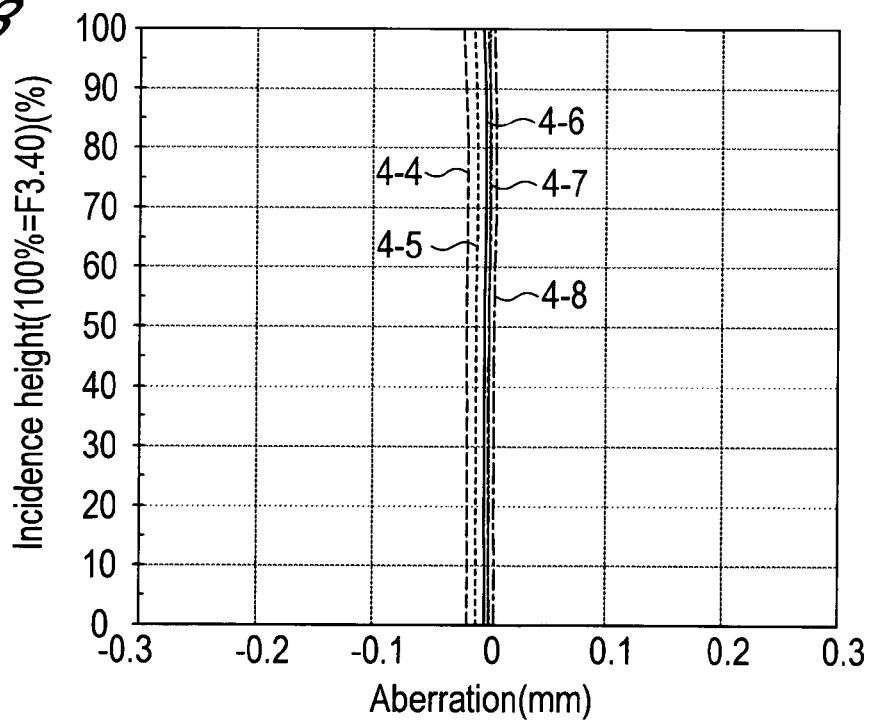
FIG. 18 is a diagram depicting the chromatic/spherical aberration of the imaging lens of the fourth embodiment.

FIG. 16 shows a graph of the distortion aberration curve 4-1, FIG. 17 shows a graph of the astigmatism aberration curve (aberration curve 4-2 on the meridional surface and aberration curve 4-3 on the sagittal surface), FIG. 18 shows a graph of a chromatic/spherical aberration curve (aberration curve 4-4 on a g-line, aberration curve 4-5 on an F-line, aberration curve 4-6 on an e-line, aberration curve 4-7 on a d-line, and aberration curve 4-8 on a C-line).

The vertical axes of the aberration curves in FIG. 16 and FIG. 17 show the image height by a % of the distance from the optical axis. In FIG. 16 and FIG. 17, 100% corresponds to 0.572 mm. The vertical axis of the aberration curve in FIG. 18 shows the incidence height h (F number), and the maximum thereof corresponds to 3.40. The horizontal axis of FIG. 16 shows the aberration (%), and the horizontal axes of FIG. 17 and FIG. 18 shows the value of the aberration (mm).

For the distortion aberration, the absolute value of the aberration is 4.58%, which is the maximum, at the 100% position of the image height (image height: 0.572 mm), and the absolute value of the aberration is within 4.58% in a range where the image height is 0.572 mm or less.

For the astigmatism aberration, the absolute value of the aberration is 0.0098 mm, which is the maximum, at the 70% position of the image height (image height: 0.400 mm), and the absolute value of the aberration is within 0.0098 mm in a range where the image height is 0.572 mm or less.

For the chromatic/spherical aberration, the absolute value of the aberration curve 4-4 on a g-line is 0.0221 mm, which is the maximum, at 100% of the incidence height h, and the absolute value of the aberration is within 0.0221 mm.

Therefore according to the imaging lens of the fourth embodiment, the optical length is short enough to be installed in a portable telephone, and the back focus is long enough to insert such components as a filter and cover glass between the imaging lens and the image sensing plane, and satisfactory images are acquired.

FIFTH EMBODIMENT

Fifth Embodiment is an embodiment of the second imaging lens of the present invention, where the first lens $L_1$, the third lens $L_3$, the fourth lens $L_4$, the sixth lens $L_6$, the seventh lens $L_7$ and the ninth lens $L_9$ are formed of transparent curable silicone resin SMX-7852 (Fuji Polymer Industries, Co. Ltd.) containing transparent adhesive, and the second lens $L_2$, the fifth lens $L_5$ and the eighth lens $L_8$ are formed of optical glass BK7 (made by Ohara Inc.).

Since the respective composing elements of the first to ninth lenses are the same as the above mentioned the first second and fourth embodiments, $|N_2-N_1|=|N_2-N_3|=|N_5-N_4|=|N_5-N_6|=|N_8-N_7|=|N_8-N_9|=0.00633$, which satisfies the following Conditions (1), (2), (5), (6), (9) and (10). Also $|v_2-v_1|=|v_2-v_3|=|v_5-v_4|=|v_5-v_6|=|v_8-v_7|=|v_8-v_9|=8.0$, which satisfies the following Conditions (3), (4), (7), (8), (11) and (12).

Figure 19:
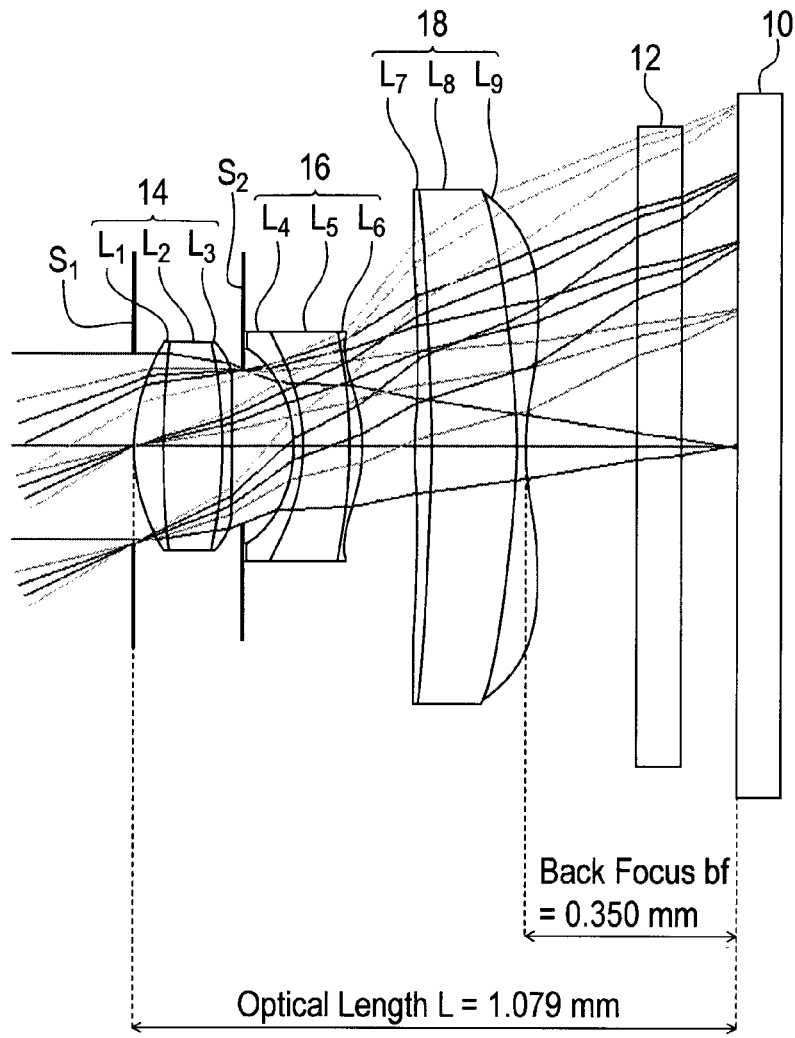
FIG. 19 is a cross-sectional view depicting an imaging lens according to a fifth embodiment.

FIG. 19 shows a cross-sectional view of the imaging lens of the fifth embodiment. As FIG. 19 shows, the first diaphragm $S_1$, which plays a role of an aperture diaphragm, is disposed at an intersection of the first surface (surface at the object side), of the first lens $L_1$ constituting the first junction type compound lens 14 and the optical axis. The second diaphragm $S_2$, which plays a role of preventing a flare or smear, is disposed between the first junction type compound lens 14 and the second junction type compound lens 16.

The diaphragm surface of the first diaphragm $S_1$ is a plane $r_1$, so $r_1=\infty$ is indicated in Table 5. The second diaphragm $S_2$ is comprised of the plane $r_6$, so $r_6=\infty$ is indicated in Table 5. The F number Fno is 2.80.

As Table 5 shows, the second lens $L_2$ is a bi-convex lens, of which both side faces are convex surfaces since $r_3$ is a positive value and $r_4$ is a negative value, the fifth lens $L_5$ is a meniscus lens of which convex surface is facing the image side since $r_7$ is a negative value and $r_8$ is also a negative value, and the eighth lens $L_8$ is a meniscus lens of which convex surface is facing the image side, since $r_{12}$ is a negative value and $r_{13}$ is also a negative value.

The first lens $L_1$ is a lens where the object side face of this first lens $L_1$ is a convex surface facing the object side on a paraxial line, since $r_2$ is a positive value. The third lens $L_3$ is a lens where the image side face of this third lens $L_3$ is a convex surface facing the image side on a paraxial line, since $r_5$ is a negative value.

The fourth lens $L_4$ is a lens where the object side face of this fourth lens $L_4$ is a concave surface facing the object side on a paraxial line, since $r_7$ is a negative value. The sixth lens $L_6$ is a lens where the image side face of this sixth lens $L_6$ is a convex surface facing the image side on a paraxial line, since $r_{10}$ is a negative value.

The seventh lens $L_7$ is a lens where the object side face of this seventh lens $L_7$ is a convex surface facing the object side on a paraxial line, since $r_{11}$ is a positive value. The ninth lens $L_9$ is a lens where the image side face of this ninth lens $L_9$ is a concave surface facing the image side on a paraxial line, since $r_{14}$ is a positive value.

As FIG. 19 shows, the optical path L with respect to the focal lengths f=1.00 mm is 1.079 mm, and the back focus bf is 0.350 mm.

Figure 20:
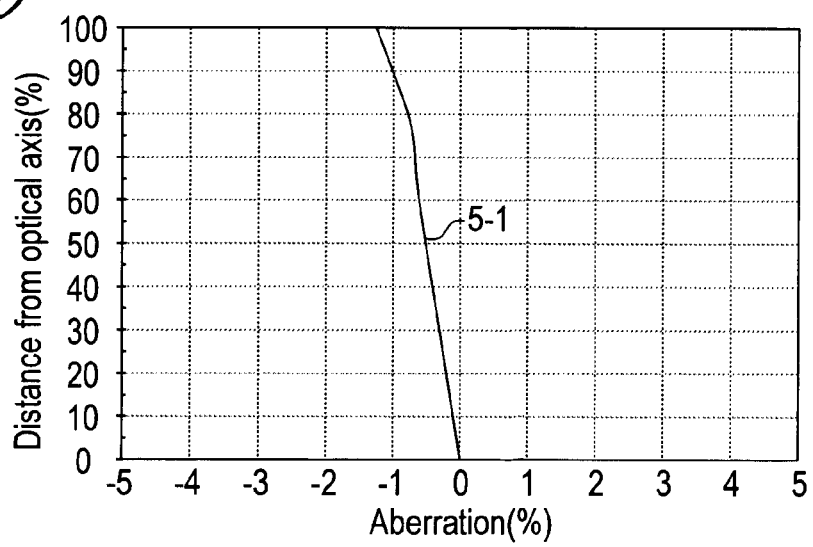
FIG. 20 is a diagram depicting the distortion aberration of the imaging lens of the fifth embodiment.
Figure 21:
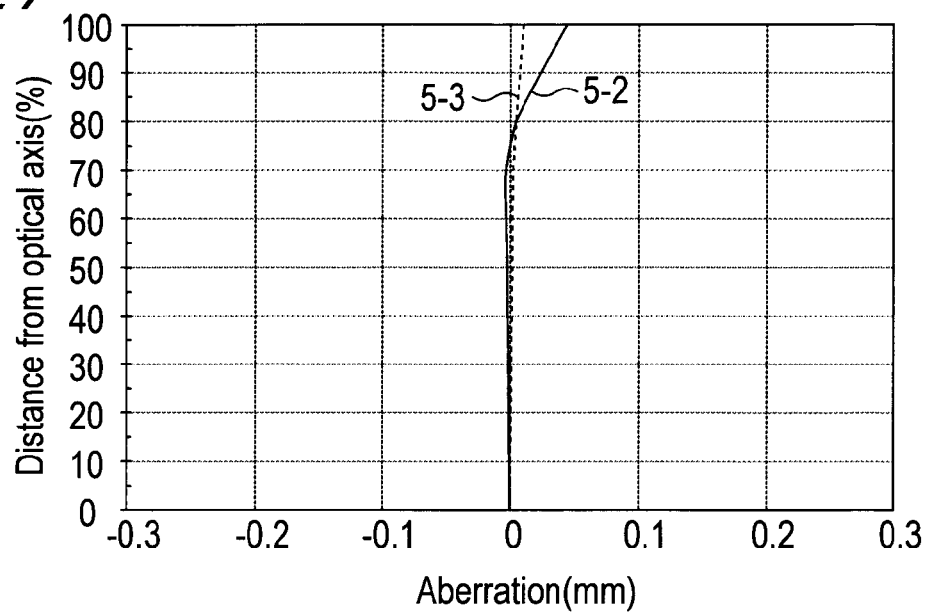
FIG. 21 is a diagram depicting the astigmatism aberration of the imaging lens of the fifth embodiment.

FIG. 20 shows a graph of the distortion aberration curve 5-1, FIG. 21 shows a graph of the astigmatism aberration curve (aberration curve 5-2 on the meridional surface and aberration curve 5-3 on the sagittal surface), FIG. 22 shows a graph of a chromatic/spherical aberration curve (aberration curve 5-4 on a g-line, aberration curve 5-5 on an F-line, aberration curve 5-6 on an e-line, aberration curve 5-7 on a d-line, and aberration curve 5-8 on a C-line).

The vertical axes of the aberration curves in FIG. 20 and FIG. 21 show the image height by a % of the distance from the optical axis. In FIG. 20 and FIG. 21, 100% corresponds to 0.620 mm. The vertical axes of the aberration curve in FIG. 22 shows the incidence height h (F number), and the maximum thereof corresponds to 2.80. The horizontal axis of FIG. 20 shows the aberration (%), and the horizontal axes of FIG. 21 and FIG. 22 show the value of the aberration (mm).

For the distortion aberration, the absolute value of the aberration is 1.26%, which is the maximum, at the 100% position of the image height (image height: 0.620 mm), and the absolute value of the aberration is within 1.26% in a range where the image height is 0.620 mm or less.

For the astigmatism aberration, the absolute value of the aberration is 0.0444 mm, which is the maximum, at the 100% position of the image height (image height: 0.620 mm), and the absolute value of the aberration is within 0.0444 mm in a range where the image height is 0.620 mm or less.

For the chromatic/spherical aberration, the absolute value of the aberration curve 5-4 on a g-line is 0.0416 mm, which is the maximum, at 100% of the incidence height h, and the absolute value of the aberration is within 0.0416 mm.

Therefore according to the imaging lens of the fifth embodiment, the optical length is short enough to be installed in a portable telephone, and the back focus is long enough to insert such components as a filter and cover glass between the imaging lens and the image sensing plane, and satisfactory images are acquired.

As the description on the imaging lenses according to the first embodiment to the fifth embodiment show, the problems to be solved by this invention are solved by designing each composing lens of the imaging lens so as to satisfy the above Expression (1) to (12). In other words, an imaging lens, where various aberrations are well corrected, sufficient back focus is acquired, and optical length is kept short, can be acquired.

As described above, the imaging lens of the present invention is suitable not only for a lens for a camera built into a portable telephone, personal computer or digital camera, but also for a lens for a camera built into a personal digital assistant (PDA), a lens for a camera built into a toy having an image recognition function, and a lens for a camera built into monitoring, inspection or crime prevention equipment.

<Manufacturing Method for Junction Type Compound Lens>

The manufacturing steps of a junction type compound lens will now be described with reference to FIG. 23(A) to (G). Here the first junction type compound lens will be described as an example, but the manufacturing steps are all the same for the second junction type compound lens and the third junction type compound lens. In the case of the second junction type compound lens, replace the first lens $L_1$, second lens $L_2$, third lens $L_3$ with the fourth lens $L_4$, fifth lens $L_5$ and sixth lens $L_6$ respectively in the following description, and in the case of the third junction type compound lens, replaces the first lens $L_1$, second lens $L_2$ and third lens $L_3$ with the seventh lens $L_7$, eighth lens $L_8$ and ninth lens $L_9$ respectively. In the following description of the manufacturing method for a junction type compound lens, a first junction type compound lens will simply be called "junction type compound lens".

Figure 23A:
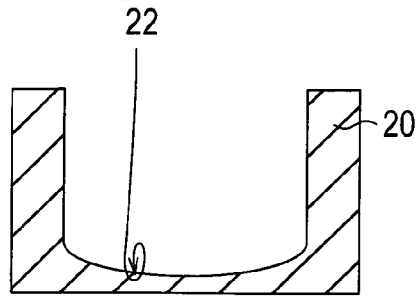
Figure 23D:
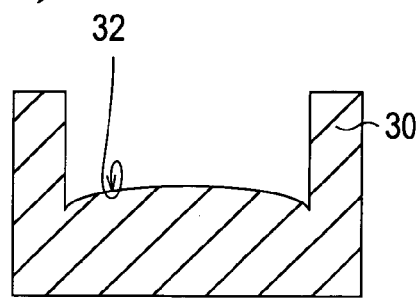
Figure 23B:
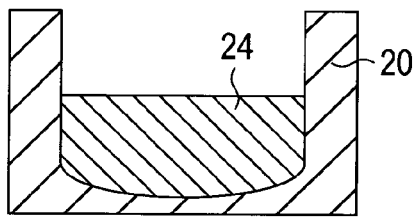
Figure 23E:
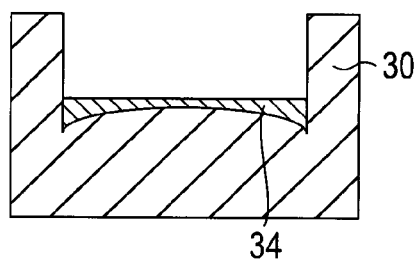
Figure 23C:
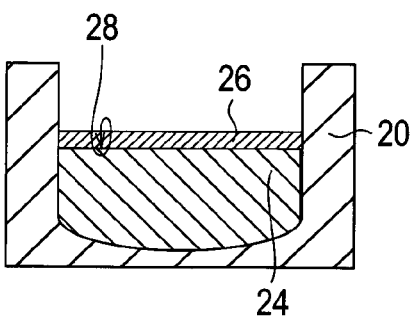
Figure 23F:
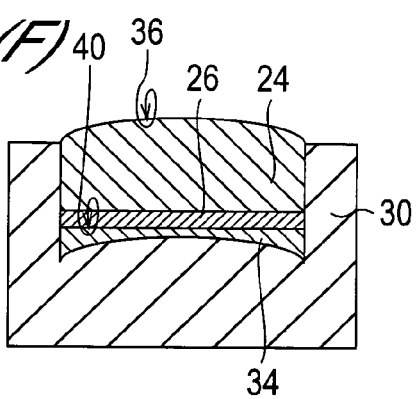
Figure 23G:
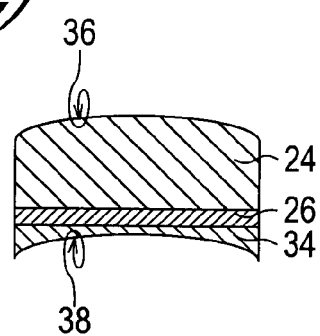

FIG. 23(A) to (G) are diagrams depicting the manufacturing steps of a junction type compound lens. FIG. 23(A) to (F) show cross-sections when a cylindrical die, used for forming the following first lens and third lens, is sectioned in a direction along a center line of the cylinder, including this center line. FIG. 23(B), (C), (E) and (F) include a silicone resin and optical glass, which are the composing materials of the junction type compound lens. FIG. 23(G) shows a cross-section of a junction type compound lens formed by the manufacturing steps of the junction type compound lens with reference to FIG. 23(A) to (F), sectioned along the optical axis of the junction type compound lens, including this optical axis.

FIG. 23(A) is a cross-sectional view of a die 20 for forming the second lens $L_2$ joining with the first lens $L_1$. The die 20 is a cylinder where the side wall of the inner face is cylindrical, and the bottom face 22 is a curved surface, which is downwardly convex for forming an object side face of the first lens $L_1$. In other words, the shape of the bottom face 22 is a shape the same as the curved surface of the object side face of the first lens $L_1$.

FIG. 23(B) shows a state where transparent curable silicone resin 24, which is in a liquid state before curing, is injected into the die 20. In the manufacturing steps of the junction type compound lens to be described below, a case of using a thermo-setting resin will be described as an example, but a UV-curable resin can also be used.

Generally a thermo-setting resin is a resin which is cured by high temperature during molding. The thermo-setting resin is cured by progressing a cross-linking reaction, where the side chains protruding from a chain type long polymer are bonded with the side chains of another polymer, by high temperature, and the polymers are three-dimensionally bonded and immobilized. Since the cross-linking reaction is an irreversible, the thermo-setting resin once cured does not become soft, even if reheated.

It is preferable that a filler and adhesive are mixed in the thermo-setting resin used for this invention. This is to maintain the bonding strength between the first lens $L_1$ and the second lens $L_2$, and the bonding strength between the second lens $L_2$ and the third lens $L_3$ to a strength whereby the lenses do not separate during the manufacturing steps and during use as an imaging lens.

A UV-curable resin is normally comprised of monomers and oligomers (a major component of resin, an intermediate material between a polymer and monomer), an optical initiator and additive agent. If ultraviolet is irradiate onto this mixture, the optical initiator is converted from a monomer (diluent of resin, constituting a part of cured resin) in a liquid state into a polymer in a solid state by a photo-polymerization reaction. For a UV-curable resin as well, it is preferable that a filler and adhesive are mixed in, just like the case of thermo-setting resin.

FIG. 23(C) shows a state when one surface of an optical glass 26, to be the second lens $L_2$, and a surface 28 of the transparent curable silicone resin 24 in a liquid state before curing, are contacted. In this state, the temperature of the die 20 is increased to the curing temperature of the transparent curable silicone resin 24, so as to cure the transparent curable silicone resin 24. After the transparent curable silicone resin 24 is cured by heat, the die 20 is cooled down, and the compound lens, in a state of the cured transparent curable silicone resin 24 being bonded with the optical glass 26, is removed. The compound lens in this state is a doubled lens where the first lens $L_1$ and the second lens $L_2$ are directly bonded.

In the above mentioned imaging lenses of the first embodiment to the fifth embodiment, the inventor of the present invention confirmed that the first lens $L_1$ and the second lens $L_2$ can be formed such that the bonding strength thereof can be maintained to a strength whereby separation does not occur during the manufacturing steps and during use as an imaging lens.

FIG. 23(D) is a cross-sectional view of a die 30 for further bonding with the third lens $L_3$ to the above mentioned compound lens, where the first lens $L_1$ and the second lens $L_2$ are bonded. Just like the die 20, the die 30 is a cylinder where the side wall of the inner face is cylindrical, and the bottom face 32 is a curved surface which is upwardly convex for forming an image face of the third lens $L_3$. In other words, the shape of the bottom face 32 is a shape the same as the curved surface of the image side face of the third lens $L_3$.

FIG. 23(E) shows a state where transparent curable silicone resin 34, which is in a liquid state before curing, is injected into the die 30. For the transparent curable silicone resin 34, a resin similar to the transparent curable silicone resin 24, or a different resin, may be used. In any case, it is preferable to use a silicone resin selected as appropriate for the design of the junction type compound lens of the present invention.

FIG. 23(F) shows a state where a surface of the second lens $L_2$, the opposite side of the side where the first lens $L_1$ of the compound lens where the first lens $L_1$ and the second lens $L_2$ are bonded, and a surface 40 of the liquid transparent curable silicon resin 34 in a pre-curing state, are contacted. The compound lens where the first lens $L_1$ and the second lens $L_2$ are bonded refers to a doubled junction type compound lens comprised of the transparent curable silicone resin 24 and the optical glass 26 (second lens $L_2$).

In the state shown in FIG. 23(F), the temperature of the die 30 is increased to the curing temperature of the transparent curable silicone resin 34, so as to cure the transparent curable silicone resin 34. At this time, the transparent curable silicone resin 24 has already been cured by heat, so the shape does not change even if the temperature of the transparent curable silicone resin 34 is increased to the curing temperature.

After the transparent curable silicone resin 34 is cured, the die 30 is cooled down, and the junction type compound lens (tripled junction type compound lens of the present invention), in a state where the cured transparent curable silicone resin 34 (formed as the third lens $L_3$) is bonded with the above mentioned doubled junction type compound lens where the first lens $L_1$ and the second lens $L_2$ are bonded, is removed.

In the imaging lenses of the first embodiment to the fifth embodiment, the inventor of the present invention confirmed that the second lens $L_2$ and the third lens $L_3$ can be formed such that the bonding strength thereof can be maintained as a strength whereby separation does not occur during the manufacturing steps and during use as an imaging lens.

FIG. 23(G) is a cross-sectional view of the junction type composite lens completed via the above manufacturing steps, sectioned in a direction along the optical axis. The transparent curable silicone resin 24 is the first lens $L_1$, the optical glass 26 is the second lens $L_2$, and the transparent curable silicone resin 34 is the third lens $L_3$. In the junction type compound lens shown in FIG. 23(G), the object side face 36 of the first lens has a convex surface facing the object side, and the image side face 38 of the third lens has a concave surface facing the image side.

The manufacturing steps of the junction type compound lens described with reference to FIG. 23(A) to (G) are manufacturing steps using dies, assuming the case of manufacturing a junction type compound lens, wherein the second lens $L_2$ is a plane parallel glass plate, the first lens $L_1$ is a plano-convex lens where the object side face 36 of this first lens $L_1$ is a convex surface facing the object side, and the third lens $L_3$ is a plano-concave lens where the image side face 38 of this third lens $L_3$ is a concave surface facing the image side. However, a junction type compound lens, of which convex and concave directions of the lens surfaces are different, can also be manufactured by similar steps. The shape of the object side face 36 of the first lens $L_1$ is determined by the shape of the bottom face 22 of the die 20. The shape of the image side face 38 of the third lens $L_3$ is determined by the shape of the bottom face 32 of the die 30. In other words, the shapes of the bottom faces of the die 20 and the die 30 are matched with the shape of the object side face 36 of the first lens $L_1$ and the shape of the image side face 38 of the third lens $L_3$ respectively.

In the manufacturing steps of the junction type compound lens described with reference to FIG. 23(A) to (G), the first lens and the third lens are formed of thermo-setting resin, so a temperature control device for increasing the temperature of the die 20 and the die 30, and controlling processing, is required. The configuration of the temperature control device is a part of the design issues of the junction type compound lens manufacturing device, so the temperature control device is omitted in FIG. 23(A) to (G).

To form the first lens $L_1$ and the third lens $L_3$ of UV-curable resin, the junction type compound lens manufacturing device is designed so that ultraviolet can be irradiated onto the UV-curable resin from the area above the die 20 and the die 30.

The invention claimed is:

1. An imaging lens comprising a first junction type compound lens, an aperture diaphragm, a second junction type compound lens, and a third junction type compound lens, wherein said first junction type compound lens, said aperture diaphragm, said second junction type compound lens, and said third junction type compound lens are arranged in this sequence from an object side to an image side, said first junction type compound lens comprises a first lens, a second lens, and a third lens arranged in this sequence from the object side to the image side, said second junction type compound lens comprises a fourth lens, a fifth lens and a sixth lens arranged in this sequence from the object side to the image side, the third junction type compound lens comprises a seventh lens, an eighth lens and a ninth lens arranged in this sequence from the object side to the image side, said first lens, said third lens, said fourth lens, said sixth lens, said seventh lens and said ninth lens are formed of a curable resin material, said second lens, said fifth lens and said eighth lens are formed of a high softening temperature glass material, said first lens and said second lens are directly bonded, said second lens and said third lens are directly bonded, said fourth lens and said fifth lens are directly bonded, said fifth lens and said sixth lens are directly bonded, said seventh lens and said eighth lens are directly bonded, and said eighth lens and said ninth lens are directly bonded, and the following conditions (1) to (12) are satisfied, $$0 \leq |N_2 - N_1| \leq 0.1 \quad (1)$$

$$0 \leq |N_2 - N_3| \leq 0.1 \quad (2)$$

$$0 \leq |\nu_2 - \nu_1| \leq 30.0 \quad (3)$$

$$0 \leq |\nu_2 - \nu_3| \leq 30.0 \quad (4)$$

$$0 \leq |N_5 - N_4| \leq 0.1 \quad (5)$$

$$0 \leq |N_5 - N_6| < 0.1 \quad (6)$$

$0 \leq |\nu_5 - \nu_4| \leq 30.0$ (7)

$0 \leq |\nu_5 - \nu_6| \leq 30.0$ (8)

$0 \leq |N_8 - N_7| \leq 0.1$ (9)

$0 \leq |N_8 - N_9| \leq 0.1$ (10)

$0 \leq |\nu_8 - \nu_7| \leq 30.0$ (11)

$0 \leq |\nu_8 - \nu_9| \leq 30.0$ (12)

where
$N_1$: refractive index of said first lens
$N_2$: refractive index of said second lens
$N_3$: refractive index of said third lens
$\nu_1$: Abbe number of said first lens
$\nu_2$: Abbe number of said second lens
$\nu_3$: Abbe number of said third lens
$N_4$: refractive index of said fourth lens
$N_5$: refractive index of said fifth lens
$N_6$: refractive index of said sixth lens
$\nu_4$: Abbe number of said fourth lens
$\nu_5$: Abbe number of said fifth lens
$\nu_6$: Abbe number of said sixth lens
$N_7$: refractive index of said seventh lens
$N_8$: refractive index of said eighth lens
$N_9$: refractive index of said ninth lens
$\nu_7$: Abbe number of said seventh lens
$\nu_8$: Abbe number of said eighth lens
$\nu_9$: Abbe number of said ninth lens.

2. An imaging lens comprising an aperture diaphragm (first diaphragm), a first junction type compound lens, a second diaphragm, a second junction type compound lens, and a third junction type compound lens,
wherein
said aperture diaphragm, said first junction type compound lens, said second diaphragm, said second junction type compound lens, and said third junction type compound lens are arranged in this sequence from an object side to an image side,
said first junction type compound lens comprises a first lens, a second lens, and a third lens arranged in this sequence from the object side to the image side,
said second junction type compound lens comprises a fourth lens, a fifth lens, and a sixth lens arranged in this sequence from the object side to the image side,
said third junction type compound lens comprises a seventh lens, an eighth lens, and a ninth lens arranged in this sequence from the object side to the image side,
said first lens, said third lens, said fourth lens, said sixth lens, said seventh lens, and said ninth lens are formed of a curable resin material,
said second lens, said fifth lens, and said eighth lens are formed of a high softening temperature glass material,
said first lens and said second lens are directly bonded, said second lens and said third lens are directly bonded, said fourth lens and said fifth lens are directly bonded, said fifth lens and said sixth lens are directly bonded, said seventh lens and said eighth lens are directly bonded, and said eighth lens and said ninth lens are directly bonded, and
the following conditions (1) to (12) are satisfied, $0 \leq |N_2 - N_1| \leq 0.1$ (1)

$0 \leq |N_2 - N_3| \leq 0.1$ (2)

$0 \leq |\nu_2 - \nu_1| \leq 30.0$ (3)

$0 \leq |\nu_2 - \nu_3| \leq 30.0$ (4)

$0 \leq |N_5 - N_4| \leq 0.1$ (5)

$0 \leq |N_5 - N_6| < 0.1$ (6)

$0 \leq |\nu_5 - \nu_4| \leq 30.0$ (7)

$0 \leq |\nu_5 - \nu_6| \leq 30.0$ (8)

$0 \leq |N_8 - N_7| \leq 0.1$ (9)

$0 \leq |N_8 - N_9| \leq 0.1$ (10)

$0 \leq |\nu_8 - \nu_7| \leq 30.0$ (11)

$0 \leq |\nu_8 - \nu_9| \leq 30.0$ (12)

where
$N_1$: refractive index of said first lens
$N_2$: refractive index of said second lens
$N_3$: refractive index of said third lens
$\nu_1$: Abbe number of said first lens
$\nu_2$: Abbe number of said second lens
$\nu_3$: Abbe number of said third lens
$N_4$: refractive index of said fourth lens
$N_5$: refractive index of said fifth lens
$N_6$: refractive index of said sixth lens
$\nu_4$: Abbe number of said fourth lens
$\nu_5$: Abbe number of said fifth lens
$\nu_6$: Abbe number of said sixth lens
$N_7$: refractive index of said seventh lens
$N_8$: refractive index of said eighth lens
$N_9$: refractive index of said ninth lens
$\nu_7$: Abbe number of said seventh lens
$\nu_8$: Abbe number of said eighth lens
$\nu_9$: Abbe number of said ninth lens.

3. The imaging lens according to claim 1, wherein
said second lens is a plane parallel glass plate,
said first lens is a plano-convex lens where the object side face of said first lens is a convex surface facing the object side on a paraxial line,
said third lens is a plano-concave lens where the image side face of said third lens is a concave surface facing the image side on a paraxial line,
said fifth lens is a plane parallel glass plate,
said fourth lens is a plano-concave lens where the object side face of said fourth lens is a concave surface facing the object side on a paraxial line,
said sixth lens is a plano-convex lens where the image side face of said sixth lens is a convex surface facing the image side on a paraxial line,
said eighth lens is a plane parallel glass plate,
said seventh lens is a plano-convex lens where the object side face of said seventh lens is a convex surface facing the object side on a paraxial line, and
said ninth lens is a plano-concave lens where the image side face of said ninth lens is a concave surface facing the image side on a paraxial line.

4. The imaging lens according to claim 2, wherein
said second lens is a plane parallel glass plate,
said first lens is a plano-convex lens where the object side face of said first lens is a convex surface facing the object side on a paraxial line,
said third lens is a plano-convex lens where the image side face of said third lens is a convex surface facing the image side on a paraxial line,
said fifth lens is a plane parallel glass plate, said fourth lens is a plano-concave lens where the object side face of said fourth lens is a concave surface facing the object side on a paraxial line,
said sixth lens is a plano-convex lens where the image side face of said sixth lens is a convex surface facing the image side on a paraxial line,
said eighth lens is a plane parallel glass plate,
said seventh lens is a plano-convex lens where the object side face of said seventh lens is a convex surface facing the object side on a paraxial line, and
said ninth lens is a plano-concave lens where the image side face of said ninth lens is a concave surface facing the image side on a paraxial line.

5. The imaging lens according to claim 1, wherein
said second lens is a meniscus lens of which convex surface faces the object side,
said first lens is a lens where the object side face of said first lens is a convex surface facing the object side on a paraxial line,
said third lens is a lens where the image side face of said third lens is a concave surface facing the image side on a paraxial line,
said fifth lens is a meniscus lens of which convex surface faces the image side,
said fourth lens is a lens where the object side face of said fourth lens is a concave surface facing the object side on a paraxial line,
said sixth lens is a lens where the image side face of said sixth lens is a convex surface facing the image side on a paraxial line,
said eighth lens is a bi-convex lens of which both side faces are convex surfaces,
said seventh lens is a lens where the object side face of said seventh lens is a convex surface facing the object side on a paraxial line, and
said ninth lens is a lens where the image side face of said ninth lens is a concave surface facing the image side on a paraxial line.

6. The imaging lens according to claim 2, wherein
said second lens is a bi-convex lens of which both side faces are convex surfaces,
said first lens is a lens where the object side face of said first lens is a convex surface facing the object side on a paraxial line,
said third lens is a lens where the image side face of said third lens is a convex surface facing the image side on a paraxial line,
said fifth lens is a meniscus lens of which convex surface faces the image side,
said fourth lens is a lens where the object side face of said fourth lens is a concave surface facing the object side on a paraxial line,
said sixth lens is a lens where the image side face of said sixth lens is a convex surface facing the image side on a paraxial line,
said eighth lens is a meniscus lens of which convex surface faces the image side,
said seventh lens is a lens where the object side face of the seventh lens is a convex surface facing the object side on a paraxial line, and
said ninth lens is a lens where the image side face of said ninth lens is a concave surface facing the image side on a paraxial line.

7. The imaging lens according to claim 1, wherein the object side face of said first lens, the image side face of said third lens, the object side face of said fourth lens, the image side face of said sixth lens, the object side face of said seventh lens, and the image side face of said ninth lens are aspheric.

8. The imaging lens according to claim 2, wherein the object side face of said first lens, the image side face of said third lens, the object side face of said fourth lens, the image side face of said sixth lens, the object side face of said seventh lens, and the image side face of said ninth lens are aspheric.

9. The imaging lens according to claim 1, wherein said curable resin material is a transparent curable silicone resin containing a transparent adhesive.

10. The imaging lens according to claim 2, wherein said curable resin material is a transparent curable silicone resin containing a transparent adhesive.

* * * * *